United States Patent
Baghdasaryan

(10) Patent No.: US 9,875,347 B2
(45) Date of Patent: Jan. 23, 2018

(54) SYSTEM AND METHOD FOR PERFORMING AUTHENTICATION USING DATA ANALYTICS

(71) Applicant: Nok Nok Labs, Inc., Palo Alto, CA (US)

(72) Inventor: Davit Baghdasaryan, San Francisco, CA (US)

(73) Assignee: Nok Nok Labs, Inc., Palo Alto, CA (US)

(*) Notice: Subject to any disclaimer, the term of this patent is extended or adjusted under 35 U.S.C. 154(b) by 0 days.

(21) Appl. No.: 14/448,868

(22) Filed: Jul. 31, 2014

(65) Prior Publication Data

US 2017/0109509 A1   Apr. 20, 2017

(51) Int. Cl.
  *G06F 21/31* (2013.01)
  *G06F 21/32* (2013.01)
  *H04L 29/06* (2006.01)

(52) U.S. Cl.
  CPC ............ *G06F 21/316* (2013.01); *G06F 21/32* (2013.01); *H04L 63/08* (2013.01)

(58) Field of Classification Search
  CPC ......... H04L 63/08; G06F 21/32; G06F 21/316
  (Continued)

(56) References Cited

U.S. PATENT DOCUMENTS 5,280,527 A   1/1994  Gullman et al.
5,764,789 A   6/1998  Pare, Jr. et al.
(Continued)

FOREIGN PATENT DOCUMENTS

CN   1705925 A    12/2005
CN   102763111 A  10/2012
(Continued)

OTHER PUBLICATIONS

Notification of Transmittal of the International Search Report and the Written Opinion from counterpart Patent Cooperation Treaty Application No. PCT/US15/042799, mailed Oct. 16, 2015, 8 pages.

(Continued)

*Primary Examiner* — Hadi Armouche
*Assistant Examiner* — Angela Holmes
(74) *Attorney, Agent, or Firm* — Nicholson De Vos Webster & Elliott LLP

(57) ABSTRACT

A system, apparatus, method, and machine readable medium are described for performing authentication using data analytics such as machine learning. For example, one embodiment of a method comprises: selecting a set of parameters related to user activity on a client device; receiving a request to authenticate the user for a current transaction; responsively calculating a distance between parameters associated with the current transaction and historical parameters from an existing dataset; determining a risk level associated with the current transaction based on the calculated distances between the parameters associated with the current transaction and the historical parameters; selecting one or more authentication techniques required to authenticate the user based on the risk level; performing the one or more authentication techniques to attempt to authenticate the user and generating an authentication result; and updating the historical parameters using the parameters associated with the current transaction and the authentication result.

22 Claims, 10 Drawing Sheets

(58) Field of Classification Search
USPC .......................................................... 726/5
See application file for complete search history.

(56) References Cited

U.S. PATENT DOCUMENTS

| | | | |
|---|---|---|---|
| 6,088,450 | A | 7/2000 | Davis et al. |
| 6,178,511 | B1 | 1/2001 | Cohen et al. |
| 6,377,691 | B1 | 4/2002 | Swift et al. |
| 6,618,806 | B1 | 9/2003 | Brown et al. |
| 6,751,733 | B1 | 6/2004 | Nakamura et al. |
| 6,842,896 | B1 | 1/2005 | Redding et al. |
| 6,938,156 | B2 | 8/2005 | Wheeler et al. |
| 7,155,035 | B2 | 12/2006 | Kondo et al. |
| 7,194,763 | B2 | 3/2007 | Potter et al. |
| 7,263,717 | B1 | 8/2007 | Boydstun et al. |
| 7,444,368 | B1 | 10/2008 | Wong et al. |
| 7,487,357 | B2 | 2/2009 | Smith et al. |
| 7,512,567 | B2 | 3/2009 | Bemmel et al. |
| 7,698,565 | B1 | 4/2010 | Bjorn et al. |
| 7,865,937 | B1 | 1/2011 | White et al. |
| 7,941,669 | B2 | 5/2011 | Foley et al. |
| 8,060,922 | B2 | 11/2011 | Crichton et al. |
| 8,166,531 | B2 | 4/2012 | Suzuki |
| 8,245,030 | B2 | 8/2012 | Lin |
| 8,284,043 | B2 | 10/2012 | Judd et al. |
| 8,291,468 | B1 | 10/2012 | Chickering |
| 8,353,016 | B1 | 1/2013 | Pravetz et al. |
| 8,359,045 | B1 | 1/2013 | Hopkins, III |
| 8,458,465 | B1 | 6/2013 | Stern et al. |
| 8,489,506 | B2 | 7/2013 | Hammad et al. |
| 8,516,552 | B2 | 8/2013 | Raleigh |
| 8,555,340 | B2 | 10/2013 | Potter et al. |
| 8,561,152 | B2 | 10/2013 | Novak et al. |
| 8,584,224 | B1 | 11/2013 | Pei et al. |
| 8,607,048 | B2 | 12/2013 | Nogawa |
| 8,646,060 | B1 | 2/2014 | Ben |
| 8,713,325 | B2 | 4/2014 | Ganesan |
| 8,719,905 | B2 | 5/2014 | Ganesan |
| 8,776,180 | B2 | 7/2014 | Kumar et al. |
| 8,856,541 | B1 | 10/2014 | Chaudhury et al. |
| 8,949,978 | B1 | 2/2015 | Lin et al. |
| 8,958,599 | B1 | 2/2015 | Starner |
| 8,978,117 | B2 | 3/2015 | Bentley et al. |
| 9,015,482 | B2 | 4/2015 | Baghdasaryan et al. |
| 9,032,485 | B2 | 5/2015 | Chu et al. |
| 9,083,689 | B2 | 7/2015 | Lindemann et al. |
| 9,161,209 | B1 | 10/2015 | Ghoshal et al. |
| 9,171,306 | B1 | 10/2015 | He et al. |
| 9,172,687 | B2 | 10/2015 | Baghdasaryan et al. |
| 9,396,320 | B2 | 7/2016 | Lindemann |
| 2001/0037451 | A1 | 11/2001 | Bhagavatula et al. |
| 2002/0010857 | A1 | 1/2002 | Karthik |
| 2002/0016913 | A1 | 2/2002 | Wheeler et al. |
| 2002/0040344 | A1 | 4/2002 | Preiser et al. |
| 2002/0073316 | A1 | 6/2002 | Collins et al. |
| 2002/0073320 | A1 | 6/2002 | Rinkevich et al. |
| 2002/0087894 | A1 | 7/2002 | Foley et al. |
| 2002/0112170 | A1 | 8/2002 | Foley et al. |
| 2002/0174344 | A1 | 11/2002 | Ting |
| 2002/0174348 | A1 | 11/2002 | Ting |
| 2003/0055792 | A1 | 3/2003 | Kinoshita et al. |
| 2003/0065805 | A1 | 4/2003 | Barnes et al. |
| 2003/0084300 | A1 | 5/2003 | Koike |
| 2003/0087629 | A1 | 5/2003 | Juitt et al. |
| 2003/0115142 | A1 | 6/2003 | Brickell et al. |
| 2003/0135740 | A1 | 7/2003 | Talmor et al. |
| 2003/0152252 | A1 | 8/2003 | Kondo et al. |
| 2003/0226036 | A1 | 12/2003 | Bivens et al. |
| 2003/0236991 | A1 | 12/2003 | Letsinger |
| 2004/0101170 | A1 | 5/2004 | Tisse et al. |
| 2004/0123153 | A1 | 6/2004 | Wright et al. |
| 2005/0021964 | A1 | 1/2005 | Bhatnagar et al. |
| 2005/0080716 | A1 | 4/2005 | Belyi et al. |
| 2005/0097320 | A1 | 5/2005 | Golan et al. |
| 2005/0125295 | A1 | 6/2005 | Tidwell et al. |
| 2005/0160052 | A1 | 7/2005 | Schneider et al. |
| 2005/0187883 | A1 | 8/2005 | Bishop et al. |
| 2005/0223236 | A1 | 10/2005 | Yamada et al. |
| 2005/0278253 | A1 | 12/2005 | Meek et al. |
| 2006/0026671 | A1 | 2/2006 | Potter et al. |
| 2006/0029062 | A1 | 2/2006 | Rao et al. |
| 2006/0156385 | A1 | 7/2006 | Chiviendacz et al. |
| 2006/0161435 | A1 | 7/2006 | Atef et al. |
| 2006/0161672 | A1 | 7/2006 | Jolley et al. |
| 2006/0282670 | A1 | 12/2006 | Karchov |
| 2007/0005988 | A1 | 1/2007 | Zhang et al. |
| 2007/0077915 | A1 | 4/2007 | Black et al. |
| 2007/0088950 | A1 | 4/2007 | Wheeler et al. |
| 2007/0100756 | A1 | 5/2007 | Varma |
| 2007/0106895 | A1 | 5/2007 | Huang et al. |
| 2007/0107048 | A1 | 5/2007 | Halls et al. |
| 2007/0118883 | A1 | 5/2007 | Potter et al. |
| 2007/0165625 | A1 | 7/2007 | Eisner et al. |
| 2007/0168677 | A1 | 7/2007 | Kudo et al. |
| 2007/0169182 | A1 | 7/2007 | Wolfond et al. |
| 2007/0198435 | A1 | 8/2007 | Siegal et al. |
| 2007/0239980 | A1 | 10/2007 | Funayama |
| 2007/0278291 | A1 | 12/2007 | Rans et al. |
| 2007/0286130 | A1 | 12/2007 | Shao et al. |
| 2008/0005562 | A1 | 1/2008 | Sather et al. |
| 2008/0025234 | A1 | 1/2008 | Zhu et al. |
| 2008/0028453 | A1 | 1/2008 | Nguyen et al. |
| 2008/0034207 | A1 | 2/2008 | Cam-Winget et al. |
| 2008/0046334 | A1 | 2/2008 | Lee et al. |
| 2008/0046984 | A1 | 2/2008 | Bohmer et al. |
| 2008/0049983 | A1 | 2/2008 | Miller et al. |
| 2008/0086759 | A1 | 4/2008 | Colson |
| 2008/0134311 | A1 | 6/2008 | Medvinsky et al. |
| 2008/0141339 | A1 | 6/2008 | Gomez et al. |
| 2008/0172725 | A1 | 7/2008 | Fujii et al. |
| 2008/0209545 | A1 | 8/2008 | Asano |
| 2008/0232565 | A1 | 9/2008 | Kutt et al. |
| 2008/0235801 | A1 | 9/2008 | Soderberg et al. |
| 2008/0271150 | A1 | 10/2008 | Boerger et al. |
| 2008/0289019 | A1 | 11/2008 | Lam |
| 2008/0289020 | A1 | 11/2008 | Cameron et al. |
| 2008/0313719 | A1 | 12/2008 | Kaliski, Jr. et al. |
| 2008/0320308 | A1 | 12/2008 | Kostiainen et al. |
| 2009/0049510 | A1 | 2/2009 | Zhang et al. |
| 2009/0064292 | A1 | 3/2009 | Carter et al. |
| 2009/0089870 | A1 | 4/2009 | Wahl |
| 2009/0100269 | A1 | 4/2009 | Naccache |
| 2009/0116651 | A1 | 5/2009 | Liang et al. |
| 2009/0133113 | A1 | 5/2009 | Schneider |
| 2009/0138724 | A1 | 5/2009 | Chiou et al. |
| 2009/0138727 | A1 | 5/2009 | Campello De Souza |
| 2009/0158425 | A1 | 6/2009 | Chan et al. |
| 2009/0183003 | A1 | 7/2009 | Haverinen |
| 2009/0187988 | A1 | 7/2009 | Hulten et al. |
| 2009/0193508 | A1 | 7/2009 | Brenneman et al. |
| 2009/0196418 | A1 | 8/2009 | Tkacik et al. |
| 2009/0199264 | A1 | 8/2009 | Lang |
| 2009/0204964 | A1 | 8/2009 | Foley et al. |
| 2009/0235339 | A1 | 9/2009 | Mennes et al. |
| 2009/0271618 | A1 | 10/2009 | Camenisch et al. |
| 2009/0271635 | A1 | 10/2009 | Liu et al. |
| 2009/0300714 | A1 | 12/2009 | Ahn |
| 2009/0300720 | A1 | 12/2009 | Guo et al. |
| 2009/0307139 | A1 | 12/2009 | Mardikar et al. |
| 2009/0327131 | A1 | 12/2009 | Beenau et al. |
| 2009/0328197 | A1 | 12/2009 | Newell |
| 2010/0010932 | A1 | 1/2010 | Law et al. |
| 2010/0023454 | A1 | 1/2010 | Exton et al. |
| 2010/0029300 | A1 | 2/2010 | Chen |
| 2010/0042848 | A1 | 2/2010 | Rosener |
| 2010/0062744 | A1 | 3/2010 | Ibrahim |
| 2010/0070424 | A1 | 3/2010 | Monk et al. |
| 2010/0082484 | A1 | 4/2010 | Erhart et al. |
| 2010/0083000 | A1 | 4/2010 | Kesanupalli |
| 2010/0094681 | A1 | 4/2010 | Almen et al. |
| 2010/0105427 | A1 | 4/2010 | Gupta |
| 2010/0107222 | A1 | 4/2010 | Glasser |
| 2010/0114776 | A1 | 5/2010 | Weller et al. |
| 2010/0169650 | A1 | 7/2010 | Brickell et al. |

(56) References Cited

U.S. PATENT DOCUMENTS

| | | |
|---|---|---|
| 2010/0175116 A1 | 7/2010 | Gum |
| 2010/0186072 A1 | 7/2010 | Kumar |
| 2010/0192209 A1 | 7/2010 | Steeves et al. |
| 2010/0223663 A1 | 9/2010 | Morimoto et al. |
| 2010/0242088 A1 | 9/2010 | Thomas |
| 2010/0287369 A1 | 11/2010 | Monden |
| 2010/0325427 A1 | 12/2010 | Ekberg et al. |
| 2010/0325664 A1 | 12/2010 | Kang |
| 2010/0325684 A1 | 12/2010 | Grebenik et al. |
| 2010/0325711 A1 | 12/2010 | Etchegoyen |
| 2011/0004933 A1 | 1/2011 | Dickinson et al. |
| 2011/0022835 A1 | 1/2011 | Schibuk |
| 2011/0047608 A1 | 2/2011 | Levenberg |
| 2011/0071841 A1 | 3/2011 | Fomenko et al. |
| 2011/0078443 A1 | 3/2011 | Greenstein et al. |
| 2011/0082801 A1 | 4/2011 | Baghdasaryan et al. |
| 2011/0083016 A1 | 4/2011 | Kesanupalli et al. |
| 2011/0093942 A1 | 4/2011 | Koster et al. |
| 2011/0107087 A1 | 5/2011 | Lee et al. |
| 2011/0138450 A1 | 6/2011 | Kesanupalli et al. |
| 2011/0157346 A1 | 6/2011 | Zyzdryn et al. |
| 2011/0167154 A1 | 7/2011 | Bush et al. |
| 2011/0167472 A1 | 7/2011 | Evans et al. |
| 2011/0191200 A1 | 8/2011 | Bayer et al. |
| 2011/0197267 A1 | 8/2011 | Gravel et al. |
| 2011/0219427 A1 | 9/2011 | Hito et al. |
| 2011/0225431 A1 | 9/2011 | Stufflebeam, Jr. et al. |
| 2011/0228330 A1 | 9/2011 | Nogawa |
| 2011/0231911 A1 | 9/2011 | White et al. |
| 2011/0246766 A1 | 10/2011 | Orsini et al. |
| 2011/0265159 A1 | 10/2011 | Ronda et al. |
| 2011/0279228 A1 | 11/2011 | Kumar et al. |
| 2011/0280402 A1 | 11/2011 | Ibrahim et al. |
| 2011/0296518 A1 | 12/2011 | Faynberg et al. |
| 2011/0307706 A1 | 12/2011 | Fielder |
| 2011/0307949 A1 | 12/2011 | Ronda et al. |
| 2011/0314549 A1 | 12/2011 | Song et al. |
| 2011/0320823 A1 | 12/2011 | Saroiu et al. |
| 2012/0018506 A1 | 1/2012 | Hammad et al. |
| 2012/0023568 A1 | 1/2012 | Cha et al. |
| 2012/0046012 A1 | 2/2012 | Forutanpour et al. |
| 2012/0075062 A1 | 3/2012 | Osman et al. |
| 2012/0084566 A1 | 4/2012 | Chin et al. |
| 2012/0102553 A1 | 4/2012 | Hsueh et al. |
| 2012/0124639 A1 | 5/2012 | Shaikh et al. |
| 2012/0124651 A1 | 5/2012 | Ganesan et al. |
| 2012/0144461 A1 | 6/2012 | Rathbun |
| 2012/0159577 A1 | 6/2012 | Belinkiy et al. |
| 2012/0191979 A1 | 7/2012 | Feldbau |
| 2012/0203906 A1 | 8/2012 | Jaudon et al. |
| 2012/0204032 A1 | 8/2012 | Wilkins et al. |
| 2012/0210135 A1 | 8/2012 | Panchapakesan et al. |
| 2012/0249298 A1 | 10/2012 | Sovio et al. |
| 2012/0272056 A1 | 10/2012 | Ganesan |
| 2012/0278873 A1 | 11/2012 | Calero et al. |
| 2012/0291114 A1 | 11/2012 | Poliashenko et al. |
| 2012/0313746 A1 | 12/2012 | Rahman et al. |
| 2012/0317297 A1 | 12/2012 | Bailey |
| 2013/0042327 A1 | 2/2013 | Chow |
| 2013/0046976 A1 | 2/2013 | Rosati et al. |
| 2013/0046991 A1 | 2/2013 | Lu et al. |
| 2013/0054967 A1 | 2/2013 | Davoust et al. |
| 2013/0061055 A1 | 3/2013 | Schibuk |
| 2013/0067546 A1 | 3/2013 | Thavasi et al. |
| 2013/0073859 A1 | 3/2013 | Carlson et al. |
| 2013/0086669 A1 | 4/2013 | Sondhi et al. |
| 2013/0090939 A1 | 4/2013 | Robinson et al. |
| 2013/0097682 A1 | 4/2013 | Zeljkovic et al. |
| 2013/0104187 A1 | 4/2013 | Weidner |
| 2013/0104190 A1 | 4/2013 | Simske et al. |
| 2013/0119130 A1 | 5/2013 | Braams |
| 2013/0124285 A1 | 5/2013 | Pravetz et al. |
| 2013/0124422 A1 | 5/2013 | Hubert et al. |
| 2013/0125197 A1 | 5/2013 | Pravetz et al. |
| 2013/0125222 A1 | 5/2013 | Pravetz et al. |
| 2013/0133049 A1 | 5/2013 | Peirce |
| 2013/0133054 A1 | 5/2013 | Davis et al. |
| 2013/0144785 A1* | 6/2013 | Karpenko ........... G06Q 20/409 705/44 |
| 2013/0159413 A1 | 6/2013 | Davis et al. |
| 2013/0159716 A1 | 6/2013 | Buck et al. |
| 2013/0160083 A1 | 6/2013 | Schrix et al. |
| 2013/0167196 A1 | 6/2013 | Spencer et al. |
| 2013/0219456 A1 | 8/2013 | Sharma et al. |
| 2013/0227646 A1 | 8/2013 | Haggerty et al. |
| 2013/0239173 A1 | 9/2013 | Dispensa |
| 2013/0308778 A1 | 11/2013 | Fosmark et al. |
| 2013/0318343 A1 | 11/2013 | Bjarnason et al. |
| 2013/0337777 A1 | 12/2013 | Deutsch et al. |
| 2013/0346176 A1 | 12/2013 | Alolabi et al. |
| 2014/0002238 A1 | 1/2014 | Taveau et al. |
| 2014/0007215 A1 | 1/2014 | Romano et al. |
| 2014/0013422 A1 | 1/2014 | Janus et al. |
| 2014/0033271 A1 | 1/2014 | Barton et al. |
| 2014/0040987 A1 | 2/2014 | Haugsnes |
| 2014/0044265 A1 | 2/2014 | Kocher et al. |
| 2014/0047510 A1 | 2/2014 | Belton et al. |
| 2014/0066015 A1 | 3/2014 | Aissi |
| 2014/0068746 A1 | 3/2014 | Gonzalez et al. |
| 2014/0075516 A1 | 3/2014 | Chermside |
| 2014/0089243 A1 | 3/2014 | Oppenheimer |
| 2014/0096182 A1 | 4/2014 | Smith |
| 2014/0101439 A1 | 4/2014 | Pettigrew et al. |
| 2014/0109174 A1 | 4/2014 | Barton et al. |
| 2014/0115702 A1 | 4/2014 | Li et al. |
| 2014/0130127 A1 | 5/2014 | Toole et al. |
| 2014/0137191 A1 | 5/2014 | Goldsmith et al. |
| 2014/0164776 A1 | 6/2014 | Hook et al. |
| 2014/0173754 A1 | 6/2014 | Barbir |
| 2014/0188770 A1 | 7/2014 | Agrafioti et al. |
| 2014/0189350 A1 | 7/2014 | Baghdasaryan et al. |
| 2014/0189360 A1 | 7/2014 | Baghdasaryan et al. |
| 2014/0189779 A1 | 7/2014 | Baghdasaryan et al. |
| 2014/0189791 A1 | 7/2014 | Lindemann et al. |
| 2014/0189807 A1 | 7/2014 | Cahill et al. |
| 2014/0189808 A1 | 7/2014 | Mahaffey et al. |
| 2014/0189828 A1 | 7/2014 | Baghdasaryan et al. |
| 2014/0189835 A1 | 7/2014 | Umerley |
| 2014/0201809 A1 | 7/2014 | Choyi et al. |
| 2014/0230032 A1 | 8/2014 | Duncan |
| 2014/0245391 A1 | 8/2014 | Adenuga |
| 2014/0250523 A1 | 9/2014 | Savvides et al. |
| 2014/0258125 A1 | 9/2014 | Gerber et al. |
| 2014/0258711 A1 | 9/2014 | Brannon |
| 2014/0282868 A1 | 9/2014 | Sheller et al. |
| 2014/0282945 A1 | 9/2014 | Smith et al. |
| 2014/0282965 A1 | 9/2014 | Sambamurthy et al. |
| 2014/0289117 A1 | 9/2014 | Baghdasaryan |
| 2014/0289820 A1 | 9/2014 | Lindemann et al. |
| 2014/0289833 A1 | 9/2014 | Briceno et al. |
| 2014/0298419 A1 | 10/2014 | Boubez et al. |
| 2014/0304505 A1 | 10/2014 | Dawson |
| 2015/0046340 A1 | 2/2015 | Dimmick |
| 2015/0058931 A1 | 2/2015 | Miu et al. |
| 2015/0095999 A1 | 4/2015 | Toth et al. |
| 2015/0142628 A1 | 5/2015 | Suplee et al. |
| 2015/0180869 A1 | 6/2015 | Verma |
| 2015/0244696 A1 | 8/2015 | Ma |
| 2015/0269050 A1* | 9/2015 | Filimonov .......... G06F 11/3409 702/183 |
| 2015/0326529 A1 | 11/2015 | Morita |
| 2015/0381580 A1 | 12/2015 | Graham, III et al. |
| 2016/0036588 A1 | 2/2016 | Thackston |
| 2016/0072787 A1 | 3/2016 | Balabine et al. |
| 2016/0087952 A1 | 3/2016 | Tartz et al. |
| 2016/0087957 A1 | 3/2016 | Shah et al. |
| 2016/0188958 A1 | 6/2016 | Martin |

(56) References Cited

U.S. PATENT DOCUMENTS

2017/0004487 A1 1/2017 Hagen et al.
2017/0109751 A1 4/2017 Dunkelberger et al.

FOREIGN PATENT DOCUMENTS

| | | |
|---|---|---|
| NO | 2005003985 A1 | 1/2005 |
| WO | WO 2013/082190 | 6/2013 |
| WO | 2014105994 A2 | 7/2014 |
| WO | 2015130734 A1 | 9/2015 |

OTHER PUBLICATIONS

Kong S., et al. "Recent Advances in Visual and Infrared Face Recognition: A Review," Journal of Computer Vision and Image Understanding, 2005, vol. 97 (1), pp. 103--135.
Li J., et al., "Live Face Detection Based on the Analysis of Fourier Spectra," Biometric Technology for Human Identification, 2004, pp. 296-303.
Lubin, G., et al., "16 Heatmaps That Reveal Exactly Where People Look," Business Insider, [online], May 21, 2012, [Cited: Nov. 1, 2012], Retrieved from the Internet: URL: http://www.businessinsider.com/eye-tracking-heatmaps-2012-5?pp=1, pp. 1-21.
Maatta J., et al., "Face Spoofing Detection From Single Images Using Micro-Texture Analysis," Machine Vision Group, University of Oulu, Finland, Oulu, IEEE, [online], 2011, Retrieved from the Internet: URL: http://www.ee.oulu.fi/research/mvmp/mvg/files/pdf/131.pdf., pp. 1-7.
Marcialis G.L., et al. "First International Fingerprint Liveness Detection Competition-Livdet 2009," Image Analysis and Processing-ICIAP, Springer Berlin Heidelberg, 2009. pp. 12-23.
Mobile Device Security Using Transient Authentication, IEEE Transactions on Mobile Computing, 2006, vol. 5 (11), pp. 1489-1502.
National Science & Technology Council's Subcommittee on Biometrics. Biometrics Glossary. 33 pages, Last updated Sep. 14, 2006. NSTC. http://www.biometrics.gov/documents/glossary.pdf.
Nielsen, Jakib. useit.com. Jakob Nielsen's Alertbox—Horizontal Attention Leans Left. [Online] Apr. 6, 2010. [Cited: Nov. 1, 2012.] 4 pages. http://www.useit.com/alertbox/horizontal-attention.html.
Nielsen, Jakob. useit.com. Jakob Nielsen's Alertbox—Scrolling and Attention. [Online] Mar. 22, 2010. [Cited: Nov. 1, 2012.] 6 pages. http://www.useit.com/alertbox/scrolling-attention.html.
Non-Final Office Action from U.S. Appl. No. 13/730,761 mailed Feb. 27, 2014, 24 pages.
Non-Final Office Action from U.S. Appl. No. 13/730,761 mailed Sep. 39, 2014, 36 pages.
Non-Final Office Action from U.S. Appl. No. 13/730,776 mailed Jul. 15, 2014, 16 pages.
Non-Final Office Action from U.S. Appl. No. 13/730,780 mailed Aug. 4, 2014, 30 pages.
Non-Final Office Action from U.S. Appl. No. 13/730,780 mailed Mar. 12, 2014, 22 pages.
Non-Final Office Action from U.S. Appl. No. 13/730,791 mailed Jun. 27, 2014, 17 pages.
Non-Final Office Action from U.S. Appl. No. 13/730,795 mailed Jan. 5, 2015, 19 pages.
Non-Final Office Action from U.S. Appl. No. 13/730,795 mailed Jun. 11, 2014, 14 pages.
Non-Final Office Action from U.S. Appl. No. 14/066,273 mailed Jun. 16, 2016, 43 pages.
Non-Final Office Action from U.S. Appl. No. 14/066,273 mailed May 8, 2015, 31 pages.
Non-Final Office Action from U.S. Appl. No. 14/066,384 mailed Jan. 7, 2015, 24 pages.
Non-Final Office Action from U.S. Appl. No. 14/066,384 mailed Mar. 17, 2016, 40 pages.
Non-Final Office Action from U.S. Appl. No. 14/145,439 mailed Feb. 12, 2015, 18 pages.
Non-Final Office Action from U.S. Appl. No. 14/145,466 mailed Sep. 9, 2016, 13 pages.
Non-Final Office Action from U.S. Appl. No. 14/145,533 mailed Jan. 26, 2015, 13 pages.
Non-Final Office Action from U.S. Appl. No. 14/145,607 mailed Mar. 20, 2015, 22 pages.
Non-Final Office Action from U.S. Appl. No. 14/218,551 mailed Apr. 23, 2015, 9 pages.
Non-Final Office Action from U.S. Appl. No. 14/218,551 mailed Jan. 21, 2016, 11 pages.
Non-Final Office Action from U.S. Appl. No. 14/218,551 mailed May 12, 2016, 11 pages.
Non-Final Office Action from U.S. Appl. No. 14/218,575 mailed Feb. 10, 2015, 17 pages.
Non-Final Office Action from U.S. Appl. No. 14/218,575 mailed Jan. 29, 2016, 25 pages.
Non-Final Office Action from U.S. Appl. No. 14/218,611 mailed Jun. 16, 2016, 13 pages.
Non-Final Office Action from U.S. Appl. No. 14/218,646 mailed Mar. 10, 2016, 23 pages.
Non-Final Office Action from U.S. Appl. No. 14/218,677 mailed Aug. 2, 2016, 15 pages.
Non-Final Office Action from U.S. Appl. No. 14/218,692 mailed Nov. 4, 2015, 16 pages.
Non-Final Office Action from U.S. Appl. No. 14/218,692 mailed Oct. 25, 2016, 33 pages.
Non-Final Office Action from U.S. Appl. No. 14/218,743 mailed Aug. 19, 2016, 11 pages.
Non-Final Office Action from U.S. Appl. No. 14/218,743 mailed Jan. 21, 2016, 12 pages.
Non-Final Office Action from U.S. Appl. No. 14/268,619 mailed Aug. 24, 2015, 17 pages.
Non-Final Office Action from U.S. Appl. No. 14/268,619 mailed Mar. 21, 2016, 7 pages.
Non-Final Office Action from U.S. Appl. No. 14/268,733 mailed Jul. 16, 2015, 13 pages.
Non-Final Office Action from U.S. Appl. No. 14/448,641 mailed Nov. 9, 2015, 21 pages.
Non-Final Office Action from U.S. Appl. No. 14/448,747 mailed Aug. 19, 2016, 21 pages.
Non-Final Office Action from U.S. Appl. No. 14/448,814 mailed Aug. 4, 2015, 13 pages.
Non-Final Office Action from U.S. Appl. No. 14/487,992 mailed Dec. 3, 2015, 15 pages.
Non-Final Office Action from U.S. Appl. No. 14/859,328 mailed Sep. 15, 2016, 39 pages.
Notice of Allowance from U.S. Appl. No. 14/487,992 mailed May 12, 2016, 11 pages.
Notice of Allowance from U.S. Appl. No. 13/730,761 mailed Jun. 10, 2015, 15 pages.
Notice of Allowance from U.S. Appl. No. 13/730,761 mailed Sep. 28, 2015, 5 pages.
Notice of Allowance from U.S. Appl. No. 13/730,776 mailed Feb. 13, 2015, 16 pages.
Notice of Allowance from U.S. Appl. No. 13/730,776 mailed Mar. 24, 2015, 3 pages.
Roberts C., "Biometric Attack Vectors and Defences," Sep. 2006, 25 pages. Retrieved from the Internet: URL: http://otago.ourarchive.ac.nz/bitstream/handle/10523/1243/BiometricAttackVectors.pdf.
Rocha A., et al., "Vision of the Unseen: Current Trends and Challenges in Digital Image and Video Forensics," ACM Computing Surveys, 2010, 47 pages. Retrieved from the Internet: URL: http://www.wjscheirer.com/papers/wjscsur2011forensics.pdf.
Rodrigues R.N., et al., "Robustness of Multimodal Biometric Fusion Methods Against Spoof Attacks," Journal of Visual Language and Computing. 2009. 11 pages, doi:10.1016/j.jvlc.2009.01.010; Retrieved from the Internet: URL: http://cubs.buffalo.edu/govind/papers/visual09.pdf.
Ross A., et al., "Multimodal Biometrics: An Overview," Proceedings of 12th European Signal Processing Conference (EUSIPCO),

(56) References Cited

OTHER PUBLICATIONS

Sep. 2004, pp. 1221-1224. Retrieved from the Internet: URL: http://www.csee.wvu.edu/-ross/pubs/RossMultimodaiOverviewEUSIPC004.pdf.
Schneier B., Biometrics: Uses and Abuses. Aug. 1999. Inside Risks 110 (CACM 42, Aug. 8, 1999), Retrieved from the Internet: URL: http://www.schneier.com/essay-019.pdf, 3 pages.
Schuckers, "Spoofing and Anti-Spoofing Measures," Information Security Technical Report, 2002, vol. 2002, pp. 56-62.
Schwartz et al., "Face Spoofing Detection Through Partial Least Squares and Low-Level Descriptors," International conference on Biometrics, 2011, vol. 2011, pp. 1-8.
Smiatacz M., et al., Gdansk University of Technology. Liveness Measurements Using Optical Flow for Biometric Person Authentication. Metrology and Measurement Systems. 2012, vol. XIX, 2. pp. 257-268.
Supplementary Partial European Search Report for Application No. 13867269, mailed Aug. 3, 2016, 7 pages.
T. Weigold et al., "The Zurich Trusted Information Channel-An Efficient Defence against Man-in-the-Middle and Malicious Software Attacks," P. Lipp, A.R. Sadeghi, and K.M. Koch, eds., Proc. Trust Conf. (Trust 2008), LNCS 4968, Springer-Verlag, 2008, pp. 75-91.
Tan et al., "Face Liveness Detection from a Single Image with Sparse Low Rank Bilinear Discriminative Model," European Conference on Computer Vision, 2010, vol. 2010, pp. 1-14.
The Extended M2VTS Database, [retrieved on Sep. 29, 2012], Retrieved from the Internet: URL: http://www.ee.surrey.ac.uk/CVSSP/xm2vtsdb/, 1 page.
The Online Certificate Status Protocol, OCSP, RFC2560, 22 pages.
The source for Linux information, Linux.com, [online], [retrieved on Jan. 28, 2015], 2012, 3 pages.
Transmittal of International Preliminary Report on Patentability for Patent Application No. PCT/US2013/077888 mailed on Jul. 9, 2015, 7 pages.
Transmittal of International Preliminary Report on Patentability from foreign counterpart PCT Patent Application No. PCT/US2014/031344 mailed Oct. 1, 2015, 9 pages.
Tresadern P., et al., "Mobile Biometrics (MoBio): Joint Face and Voice Verification for a Mobile Platform", 2012, 7 pages. Retrieved from the Internet: URL: http://personal.ee.surrey.ac.uk/Personai/Norman.Poh/data/tresadem_PervComp2012draft.pdf.
Tronci R., et al., "Fusion of Multiple Clues for Photo-Attack Detection in Face Recognition Systems," International Joint Conference on Biometrics, 2011. pp. 1-6.
Uludag, Umut, and Anil K. Jain. "Attacks on biometric systems: a case study in fingerprints." Electronic Imaging 2004. International Society for Optics and Photonics, 2004, 12 pages.
Unobtrusive User-Authentication on Mobile Phones using Biometric Gait Recognition, 2010, 6 pages.
Validity, OSTP Framework, 24 pages, 2010.
Vassilev, A.T.; du Castel, B.; Ali, A.M., "Personal Brokerage of Web Service Access," Security & Privacy, IEEE, vol. 5, No. 5, pp. 24-31, Sep.-Oct. 2007.
WikiPedia article for Eye Tracking, 15 pages, Last Modified Jun. 21, 2014, en.wikipedia.org/wiki/Eye_tracking.
Willis N., Linux.com. Weekend Project: Take a Tour of Open Source Eye-Tracking Software. [Online] Mar. 2, 2012. [Cited: Nov. 1, 2012.], 4 pages. Retrieved from the Internet: URL: https://www.linux.com/learn/tutorials/550880-weekend-project-take-a-tour-of-opensource-eye-tracking-software.
Wilson R., "How to Trick Google's New Face Unlock on Android 4.1 Jelly Bean," Aug. 6, 2012, 5 pages, [online], [retrieved Aug. 13, 2015]. Retrieved from the Internet: http://printscreenmac.info/how-to-trick-android-jelly-bean-faceunlock/.
World Wide Web Consortium, W3C Working Draft: Media Capture and Streams, 2013, 36 pages.
Zhang, "Security Verification of Hardware-enabled Attestation Protocols," IEEE, 2012, pp. 47-54.
Zhao W., et al., "Face Recognition: A Literature Survey," ACM Computing Surveys, 2003, vol. 35 (4), pp. 399-458.
Zhou, et al., "Face Recognition from Still Images and Videos". University of Maryland, College Park, MD 20742. Maryland : s.n., Nov. 5, 2004. pp. 1-23, Retrieved from the Internet: http://citeseerx.ist.psu.edu/viewdoc/download?doi=1 0.1.1.77.1312&rep=rep1&type=pdf.
Notice of Allowance from U.S. Appl. No. 13/730,780 mailed Aug. 13, 2015, 13 pages.
Notice of Allowance from U.S. Appl. No. 13/730,791 mailed Mar. 10, 2015, 17 pages.
Notice of Allowance from U.S. Appl. No. 13/730,795 mailed Jan. 14, 2016, 11 pages.
Notice of Allowance from U.S. Appl. No. 13/730,795 mailed May 15, 2015, 8 pages.
Notice of Allowance from U.S. Appl. No. 13/730,795 mailed Sep. 17, 2015, 11 pages.
Notice of Allowance from U.S. Appl. No. 14/066,384 mailed Sep. 27, 2016, 19 pages.
Notice of Allowance from U.S. Appl. No. 14/145,439 mailed Jul. 6, 2015, 6 pages.
Notice of Allowance from U.S. Appl. No. 14/145,439 mailed Mar. 14, 2016, 17 pages.
Notice of Allowance from U.S. Appl. No. 14/145,439 mailed Oct. 28, 2015, 12 pages.
Notice of Allowance from U.S. Appl. No. 14/145,533 mailed Jan. 20, 2016, 12 pages.
Notice of Allowance from U.S. Appl. No. 14/145,533 mailed May 11, 2015, 5 pages.
Notice of Allowance from U.S. Appl. No. 14/145,533 mailed Sep. 14, 2015, 13 pages.
Notice of Allowance from U.S. Appl. No. 14/145,607 mailed Feb. 1, 2016, 28 pages.
Notice of Allowance from U.S. Appl. No. 14/145,607 mailed Sep. 2, 2015, 19 pages.
Notice of Allowance from U.S. Appl. No. 14/268,619 mailed Oct. 3, 2016, 65 pages.
Notice of Allowance from U.S. Appl. No. 14/268,619 mailed Jul. 19, 2016, 5 pages.
Notice of Allowance from U.S. Appl. No. 14/268,686 mailed Apr. 18, 2016, 16 pages.
Notice of Allowance from U.S. Appl. No. 14/268,686 mailed Jul. 8, 2016, 4 pages.
Notice of Allowance from U.S. Appl. No. 14/268,686 mailed Mar. 30, 2016, 38 pages.
Notice of Allowance from U.S. Appl. No. 14/268,686 mailed Nov. 5, 2015, 23 pages.
Notice of Allowance from U.S. Appl. No. 14/268,733 mailed Sep. 23, 2016, 8 pages.
Notice of Allowance from U.S. Appl. No. 14/268,733 mailed Jan. 20, 2017, 62 pages.
Notice of Allowance from U.S. Appl. No. 14/448,641 mailed Jun. 7, 2016, 13 pages.
Notice of Allowance from U.S. Appl. No. 14/448,697 mailed Jan. 14, 2016, 23 pages.
Notice of Allowance from U.S. Appl. No. 14/448,697 mailed May 20, 2016, 14 pages.
Notice of Allowance from U.S. Appl. No. 14/448,697 mailed Sep. 1, 2016, 3 pages.
Notice of Allowance from U.S. Appl. No. 14/448,697 mailed Sep. 15, 2015, 14 pages.
Notice of Allowance from U.S. Appl. No. 14/487,992 mailed Dec. 27, 2016, 28 pages.
Notice of Allowance from U.S. Appl. No. 14/487,992 mailed Jun. 6, 2016, 26 pages.
Notification Concerning Transmittal of International Preliminary Report on Patentability for Application No. PCT/US14/39627, mailed on Dec. 10, 2015, 8 pages.
Notification of Transmittal of the International Search Report and the Written Opinion from counterpart Patent Cooperation Treaty Application No. PCT/US13/77888, mailed Aug. 4, 2014, 10 pages.

(56) References Cited

OTHER PUBLICATIONS

Notification of Transmittal of the International Search Report and the Written Opinion from counterpart Patent Cooperation Treaty Application No. PCT/US14/31344, mailed Nov. 3, 2014, 16 pages.
Notification of Transmittal of the International Search Report and the Written Opinion from counterpart Patent Cooperation Treaty Application No. PCT/US14/39627, mailed Oct. 16, 2014, 10 pages.
Notification of Transmittal of the International Search Report and the Written Opinion from counterpart Patent Cooperation Treaty Application No. PCT/US15/50348, mailed Dec. 22, 2015, 9 pages.
Notification of Transmittal of the International Search Report and the Written Opinion from counterpart Patent Cooperation Treaty Application No. PCT/US2015/042786, mailed Oct. 16, 2015, 8 pages.
Notification of Transmittal of the International Search Report and the Written Opinion from counterpart Patent Cooperation Treaty Application No. PCT/US2015/042870, mailed Oct. 30, 2015, 9 pages.
Notification of Transmittal of the International Search Report and the Written Opinion from counterpart Patent Cooperation Treaty Application No. PCT/US2015/42783, mailed Oct. 19, 2015, 13 pages.
Notification of Transmittal of the International Search Report and the Written Opinion from counterpart Patent Cooperation Treaty Application No. PCT/US2015/42827, mailed Oct. 30, 2015, 9 pages.
Notification of Transmittal of the International Search Report and the Written Opinion from PCT/US2015/028927, mailed Jul. 30, 2015, 12 pages
Pan G., et al., "Liveness Detection for Face Recognition" in: Recent Advances in Face Recognition, 2008, pp. 109-124, Vienna : I-Tech, 2008, Ch. 9, ISBN: 978-953-7619-34-3.
Pan G., et al., "Monocular Camera-based Face Liveness Detection by Combining Eyeblink and Scene Context," pp. 215-225, s.l. : Springer Science+Business Media, LLC, Aug. 4, 2010. Retrieved from the Internet: URL: http://www.cs.zju.edu.cn/-gpan/publication/2011-TeleSysliveness.pdf.
Peng Y., et al., "RASL: Robust Alignment by Sparse and Low-Rank Decomposition for Linearly Correlated Images", IEEE Conference on Computer Vision and Pattern Recognition, 2010, pp. 763-770. Retrieved from the Internet: URL: http://yima.csl.illinois.edu/psfile/RASL CVPR10.pdf.
Phillips P. J., et al., "Biometric Image Processing and Recognition," Chellappa, 1998, Eusipco, 8 pages.
Phillips P. J., et al., "Face Recognition Vendor Test 2002: Evaluation Report," s.l. : NISTIR 6965, 2002, 56 pages. Retrieved from the Internet: URL: http://www.facerec.org/vendors/FRVT2002_Evaluation_Report.pdf.
Phillips P.J., et al., "FRVT 2006 and ICE 2006 Large-Scale Results", NIST IR 7408, Gaithersburg, NIST, 2006, Mar. 29, 2007, pp. 1-55.
Pinto A., et al., "Video-Based Face Spoofing Detection through Visual Rhythm Analysis," Los Alamitos : IEEE Computer Society Conference Publishing Services, 2012, Conference on Graphics, Patterns and Images, 8 pages. (SIBGRAPI). Retrieved from the Internet: URL: http://sibgrapi.sid.inpe.br/rep/sid.inpe.br/sibgrapi/2012/07.13.21.16?mirror=sid.inpe.br/ banon/2001/03.30.15.38.24&metadatarepository=sid.inpe.br/sibgrapi/2012/07.13.21.1 6.53.
Quinn G.W., et al., "Performance of Face Recognition Algorithms on Compressed Images", NIST Inter Agency Report 7830, NIST, Dec. 4, 2011, 35 pages.
Ratha N.K., et al., "An Analysis of Minutiae Matching Strength," Audio-and Video-Based Biometric Person Authentication, Springer Berlin Heidelberg, 2001, 7 pages.
Ratha N.K., et al., "Enhancing Security and Privacy in Biometrics-Based Authentication Systems," IBM Systems Journal, 2001, vol. 40 (3), pp. 614-634.
Requirement for Restriction/Election from U.S. Appl. No. 14/218,504 mailed Aug. 16, 2016, 11 pages.
Abate A., et al.,"2D and 3D face recognition: A survey", 2007, pp. 1885-1906.

Advisory Action from U.S. Appl. No. 13/730,791 mailed Jan. 23, 2015, 4 pages.
Akhtar Z., et al., "Spoof Attacks on Multimodal Biometric Systems", International Conference on Information and Network Technology, 2011, vol. 4, pp. 46-51.
Bao, W., et al., "A liveness detection method for face recognition based on optical flow field", 2009, pp. 233-236, http://ieeexplore.ieee.org/stamp/stamp.jsp?tp=&arnumber=5054589&isnumber=5054562.
Barker E., et al., "Recommendation for key management Part 3: Application -Specific Key Management Guidance", NIST Special Publication 800-57, 2009, pp. 1-103.
BehavioSec, "Measuring FAR/FRR/EER in Continuous Authentication," Stockholm, Sweden (2009), 8 pages.
Brickell, E., et al., Intel Corporation; Jan Camenish, IBM Research; Liqun Chen, HP Laboratories. "Direct Anonymous Attestation". Feb. 11, 2004, pp. 1-28 [online]. Retrieved from the Internet: URL:https://eprint.iacr.org/2004/205.pdf.
Chakka M., et al., "Competition on Counter Measures to 2-D Facial Spoofing Attacks". 6 pages. .2011. http://www.csis.pace.edu/-ctapper/dps/IJCB2011/papers/130.pdf. 978-1-4577-1359- 0/11.
Chen L., et al., "Flexible and scalable digital signatures in TPM 2.0." Proceedings of the 2013 ACM SIGSAC conference on Computer & communications security. ACM, 2013, 12 pages.
Chetty G. School of ISE University of Canberra Australia. "Multilevel liveness verification for face-voice biometric authentication". BYSM-2006 Symposium. Baltimore: BYSM-Symposium 9 pages. Sep. 19, 2006. http://www.biometrics.org/bc2006/presentations/Tues_Sep_19/BSYM/19_Chetty_research.pdf.
Continuous User Authentication Using Temporal Information, http://www.cse.msu.edu/biometrics/Publications/Face/NiinumaJain_ContinuousAuth_SPIE10.pdf, 11 pages.
Crazy Egg Heatmap Shows Where People Click on Your Website, 2012, 3 pages, www.michaelhartzell.com/Blog/bid/92970/Crazy-Egg-Heatmap-shows-where-people-click-on-your-website).
Dawei Zhang; Peng Hu, "Trusted e-commerce user agent based on USB Key", Proceedings of the International MultiConference of Engineers and Computer Scientists 2008 vol. I, IMECS 2008, Mar. 19-21, 2008, Hong Kong, 7 pages.
Delac K. et al., Eds., InTech, Jun. 1, 2008, Retrieved from the Internet: http://cdn.intechopen.com/finals/81/InTech-Recent_advances_in_face_recognition.zip, ISBN 978-953-7619-34-3, Uploaded as individual Chapters 1-15, 15 pages.
Doherty, et al., Internet Engineering Task Force (IETF), "Dynamic Symmetric Key Provisioning Protocol (DSKPP)", Dec. 2010, 105 pages.
Extended European Search Report for Application No. 13867269, mailed Nov. 4, 2016, 10 pages.
Extended European Search Report for Application No. 14803988.6, mailed Dec. 23, 2016, 10 pages.
Final Office Action from U.S. Appl. No. 13/730,761 mailed Jan. 15, 2015, 31 pages.
Final Office Action from U.S. Appl. No. 13/730,761 mailed Jul. 8, 2014, 36 pages.
Final Office Action from U.S. Appl. No. 13/730,776 mailed Nov. 3, 2014, 20 pages.
Final Office Action from U.S. Appl. No. 13/730,780 mailed Jan. 27, 2015, 30 pages.
Final Office Action from U.S. Appl. No. 13/730,780 mailed May 12, 2014, 34 pages.
Final Office Action from U.S. Appl. No. 13/730,791 mailed Nov. 13, 2014, 22 pages.
Final Office Action from U.S. Appl. No. 13/730,795 mailed Aug. 14, 2014, 20 pages.
Final Office Action from U.S. Appl. No. 14/066,273 mailed Feb. 11, 2016, 29 pages.
Final Office Action from U.S. Appl. No. 14/066,273 mailed Jan. 10, 2017, 24 pages.
Final Office Action from U.S. Appl. No. 14/066,384 mailed Aug. 20, 2015, 23 pages.
Final Office Action from U.S. Appl. No. 14/218,551 mailed Sep. 9, 2015, 15 pages.

(56) References Cited

OTHER PUBLICATIONS

Final Office Action from U.S. Appl. No. 14/218,551 mailed Sep. 16, 2016, 11 pages.
Final Office Action from U.S. Appl. No. 14/218,575 mailed Aug. 7, 2015, 19 pages.
Final Office Action from U.S. Appl. No. 14/218,575 mailed Jul. 7, 2016, 29 pages.
Final Office Action from U.S. Appl. No. 14/218,646 mailed Aug. 11, 2016, 25 pages.
Final Office Action from U.S. Appl. No. 14/218,692 mailed Mar. 2, 2016, 24 pages.
Final Office Action from U.S. Appl. No. 14/268,619 mailed Dec. 14, 2015, 10 pages.
Final Office Action from U.S. Appl. No. 14/268,733 mailed Jan. 15, 2016, 14 pages.
Final Office Action from U.S. Appl. No. 14/448,814 mailed Feb. 16, 2016, 14 pages.
Final Office Action from U.S. Appl. No. 14/448,814 mailed Jun. 14, 2016, 17 pages.
Grother, P.J., et al., NIST. Report on the Evaluation of 2D Still-Image Face Recognition Algorithms, NIST IR 7709. s.l, NIST, 2011, Jun. 22, 2010, pp. 1-58.
GSM Arena. [Online] Nov. 13, 2011, [Cited: Sep. 29, 2012.], 2 pages, [retrieved on Aug. 18, 2015]. Retrieved from the Internet: URL: http://www.gsmarena.com/ice_cream_sandwichs_face_unlock_duped_using_a_photograph-news-3377.php.
Heikkila M., et al., "A Texture-Based Method for Modeling the Background and Detecting Moving Objects", Oulu : IEEE , Jun. 22 2005, Draft, Retrieved from the Internet: URL: http://www.ee.oulu.fi/mvg/files/pdf/pdf_662.pdf, 16 pages.
Hernandez, T., "But What Does It All Mean? Understanding Eye-Tracking Results (Part 3)", Sep. 4, 2007, 2 pages. EyeTools. Part III: What is a heatmap . . . really? [Online] [Cited: Nov. 1, 2012.] Retrieved from the Internet: URL:http://eyetools.com/articles/p3-understanding-eye-tracking-what-is-a-heatmap-really.
Himanshu, et al., "A Review of Face Recognition". International Journal of Research in Engineering & Applied Sciences. Feb. 2012, vol. 2, pp. 835-846. Retrieved from the Internet: URL:http://euroasiapub.org/IJREAS/Feb2012/81.pdf.
Huang L., et al., "Clickjacking: Attacks and Defenses". S.I. : Usenix Security 2012, pp. 1-16, 2012 [online]. Retrieved from the Internet: URL:https://www.usenix.org/system/files/conference/usenixsecurity12/sec12-final39.pdf.
International Preliminary Report on Patentability for Application No. PCT/US2015/028924 mailed Nov. 17, 2016, 9 pages.
International Preliminary Report on Patentability for Application No. PCT/US2015/028927 mailed Nov. 17, 2016, 10 pages.
International Search Report and Written Opinion for Application No. PCT/US2015/028924 mailed Jul. 30, 2015, 10 pages.
Jafri R., et al. "A Survey of Face Recognition Techniques," Journal of Information Processing Systems, 2009, vol. 5 (2), pp. 41-68
Julian J., et al., "Biometric Enabled Portable Trusted Computing Platform," Trust Security and Privacy in Computing and Communications (TRUSTCOM), 2011 IEEE 10th International Conference on Nov. 16, 2011, pp. 436-442, XP032086831, DOI:10.1109/TRUSTCOM.2011.56, ISBN: 978-1-577-2135-9.
Kollreider K., et al., "Evaluating Liveness by Face Images and the Structure Tensor," Halmstad, Sweden: s.n., Halmstad University, SE-30118, Sweden, [online], 2005, Retrieved from the Internet: URL: http://citeseerx.ist.psu.edu/viewdoc/download?doi=10.1.1.62.6534&rep=rep1 &type=pdf, pp. 75-80.
Kollreider K., et al., "Non-Instructive Liveness Detection by Face Images," Image and Visiob Computing, 2007, vol. 27 (3), pp. 233-244.
Communication pursuant to Rules 161(2) and 162 EPC for EP Application No. 15826364.0, dated Mar. 7, 2017, 2 pages.
Extended European Search Report from European Patent Application No. 14770682.4, dated Jan. 17, 2017, 14 pages.
Final Office Action from U.S. Appl. No. 14/145,466, dated Apr. 13, 2017, 61 pages.
Final Office Action from U.S. Appl. No. 14/218,611, dated Jan. 27, 2017, 14 pages.
Final Office Action from U.S. Appl. No. 14/218,692, dated Feb. 28, 2017, 27 pages.
Final Office Action from U.S. Appl. No. 14/218,743, dated Mar. 3, 2017, 7 pages.
Final Office Action from U.S. Appl. No. 14/448,747, dated Feb. 13, 2017, 74 pages.
Final Office Action from U.S. Appl. No. 14/859,328, dated Mar. 6, 2017, 26 pages.
Kim et al., "Secure User Authentication based on the Trusted Platform for Mobile Devices," EURASIP Journal on Wireless Communications and Networking, pp. 1-15.
Non-Final Office Action from U.S. Appl. No. 14/066,273 dated May 18, 2017, 46 pages.
Non-Final Office Action from U.S. Appl. No. 14/218,504, dated Feb. 27, 2017, 12 pages.
Non-Final Office Action from U.S. Appl. No. 14/218,575, dated May 4, 2017, 88 pages.
Non-Final Office Action from U.S. Appl. No. 14/218,646, dated Mar. 27, 2017, 24 pages.
Non-Final Office Action from U.S. Appl. No. 14/218,677, dated Feb. 10, 2017, 18 pages.
Non-final Office Action from U.S. Appl. No. 14/268,563, dated Apr. 21, 2017, 83 pages.
Non-Final Office Action from U.S. Appl. No. 14/448,814, dated Apr. 5, 2017, 57 pages.
Notice of Allowance from U.S. Appl. No. 14/066,384, dated May 23, 2017, 50 pages.
Notice of Allowance from U.S. Appl. No. 14/218,551, dated Feb. 8, 2017, 56 pages.
Notice of Allowance from U.S. Appl. No. 14/218,551, dated Mar. 1, 2017, 7 pages.
Notice of Allowance from U.S. Appl. No. 14/487,992, dated Apr. 12, 2017, 14 pages.
Office Action from foreign counterpart Taiwan Patent Application No. 102148853, dated Feb. 17, 2017, 9 pages.
Partial Supplementary European Search Report from European Patent Application No. 14770682.4, dated Oct. 14, 2016, 8 pages.
TechTarget, What is network perimeter? Definition from WhatIs.com downloaded from http://searchnetworking.techtarget.com/definition/network-perimeter on Apr. 14, 2017, 5 pages.
Final Office Action from U.S. Appl. No. 14/066,273, dated Sep. 8, 2017, 30 pages.
Final Office Action from U.S. Appl. No. 14/218,504, dated Sep. 12, 2017, 83 pages.
Final Office Action from U.S. Appl. No. 14/218,575, dated Jul. 31, 2017, 42 pages.
First Office Action and Search Report from foreign counterpart China Patent Application No. 201480025959.9, dated Jul. 7, 2017, 10 pages.
International Preliminary Report on Patentability for Application No. PCT/US2015/042786, dated Feb. 9, 2017, 7 pages.
International Preliminary Report on Patentability for Application No. PCT/US2015/042799, dated Feb. 9, 2017, 7 pages.
International Preliminary Report on Patentability for Application No. PCT/US2015/042870, dated Feb. 9, 2017, 8 pages.
International Preliminary Report on Patentability for Application No. PCT/US2015/050348, dated Mar. 30, 2017, 7 pages.
International Preliminary Report on Patentability for Application No. PCT/US2015/42783, dated Feb. 9, 2017, 12 pages.
International Preliminary Report on Patentability for Application No. PCT/US2015/42827, dated Feb. 9, 2017, 6 pages.
Martins R A., et al., "A Potpourri of Authentication Mechanisms the Mobile Device Way," CISTI, Jan. 2013, pp. 843-848.
Non-Final Office Action from U.S. Appl. No. 14/218,611, dated Sep. 19, 2017, 76 pages.
Non-Final Office Action from U.S. Appl. No. 14/218,692, dated Sep. 19, 2017, 37 pages.
Non-Final Office Action from U.S. Appl. No. 14/218,743, dated Aug. 2, 2017, 24 pages.
Non-Final Office Action from U.S. Appl. No. 14/859,328, dated Jul. 14, 2017, 29 pages.

(56) References Cited

OTHER PUBLICATIONS

Non-Final Office action from U.S. Appl. No. 15/595,460, dated Jul. 27, 2017, 9 pages.
Notice of Allowance from U.S. Appl. No. 14/066,384, dated Jul. 26, 2017, 20 pages.
Notice of Allowance from U.S. Appl. No. 14/218,551, dated Aug. 16, 2017, 24 pages.
Notice of Allowance from U.S. Appl. No. 14/448,747, dated Jun. 20, 2017, 14 pages.
Notice of Allowance from U.S. Appl. No. 14/487,992, dated Jul. 17, 2017, 8 pages.
Notice of Allowance from U.S. Appl. No. 14/487,992, dated Jun. 14, 2017, 14 pages.
Final Office Action from U.S. Appl. No. 14/218,646, dated Sep. 27, 2017, 81 pages.
Final Office Action from U.S. Appl. No. 14/218,677, dated Sep. 28, 2017, 16 pages.
Final Office Action from U.S. Appl. No. 14/268,563, dated Nov. 3, 2017, 46 pages.
Final Office Action from U.S. Appl. No. 14/448,814 dated Oct. 6, 2017, 24 pages.
Non-Final Office Action from U.S. Appl. No. 15/396,452 dated Oct. 13, 2017, 76 pages.
Notice of Allowance from U.S. Appl. No. 14/066,384, dated Dec. 1, 2017, 23 pages.
Extended European Search Report for Application No. 15786487.7, dated Oct. 23, 2017, 8 pages.
Extended European Search Report for Application No. 15786796.1, dated Nov. 33, 2017, 9 pages.
Extended European Search Report for Application No. 15826660.1, dated Nov. 16, 2017, 9 pages.
Extended European Search Report for Application No. 15827334.2, dated Nov. 17, 2017, 8 pages.
First Office Action and Search Report from foreign counterpart China Patent Application No. 201380068869.3, dated Sep. 19, 2017, 17 pages.
<Im H.C., et al., "A Design of One-Time Password Mechanism Using Public Key Infrastructure," Networked Computing and Advanced Information Management, 2008, NCM'08, 4th International Conference on IEEE, Sep. 2, 2008, pp. 18-24.
Starnberger G, et al., "QR-TAN: Secure Mobile Transaction Authentication," Availability, Reliability and Security, 2009, ARES'09, International Conference on IEEE, Mar. 16, 2009, pp. 578-585.
Uymatiao M.L.T., et al., "Time-based OTP authentication via secure tunnel (TOAST); A mobile TOTP scheme using TLS seed exchage and encrypted offline keystore," 2014 4th IEEE International Conference on Information Science and Technology, IEEE, Apr. 26, 2014, pp. 225-229.

\* cited by examiner

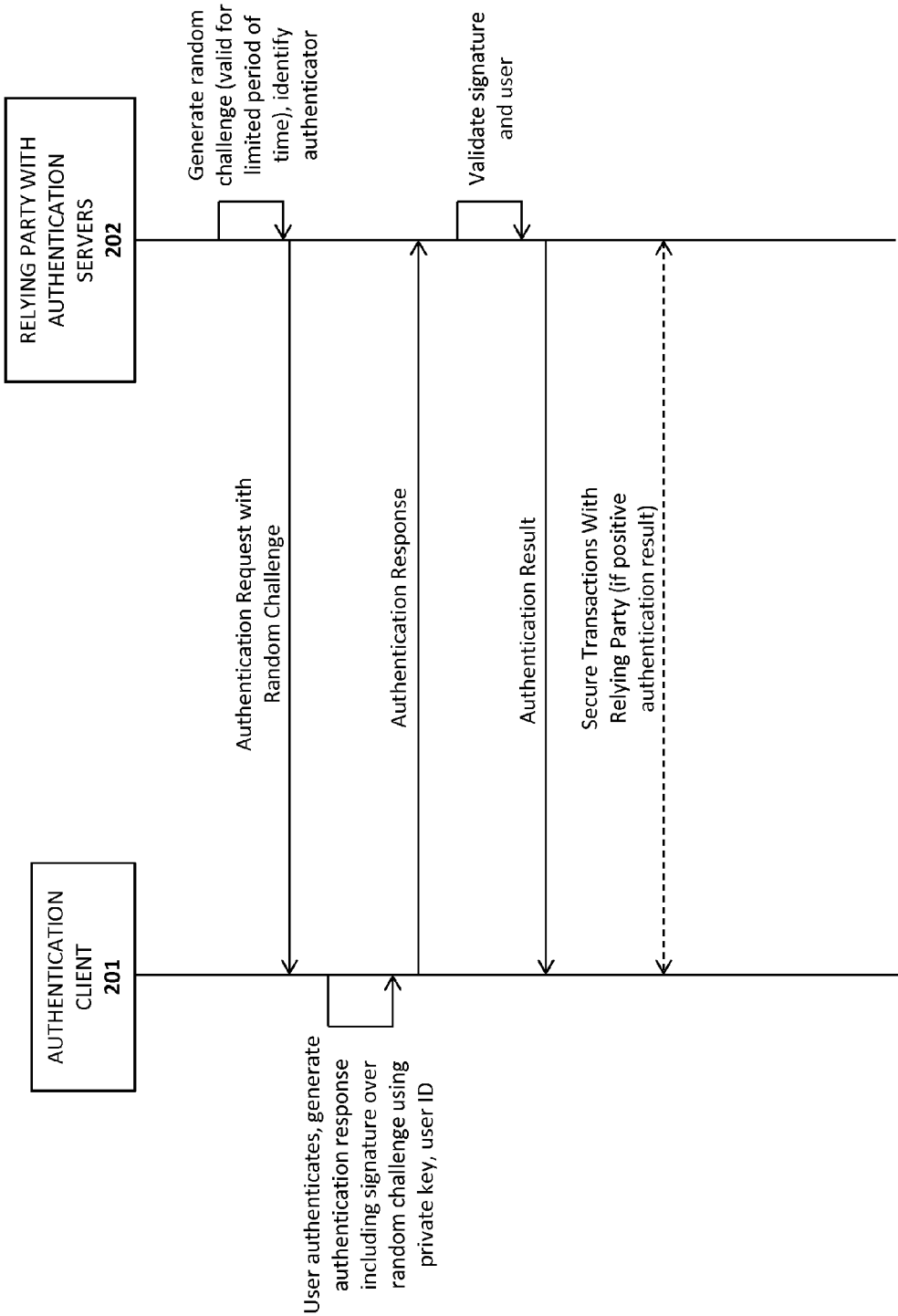

SYSTEM AND METHOD FOR PERFORMING AUTHENTICATION USING DATA ANALYTICS

BACKGROUND

Field of the Invention

This invention relates generally to the field of data processing systems. More particularly, the invention relates to a system and method for performing authentication using data analytics such as machine learning.

Description of Related Art

Systems have also been designed for providing secure user authentication over a network using biometric sensors. In such systems, the a score generated by an authenticator, and/or other authentication data, may be sent over a network to authenticate the user with a remote server. For example, patent application No. 2011/0082801 ("'801 application") describes a framework for user registration and authentication on a network which provides strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc).

The assignee of the present application has developed a variety of improvements to the authentication framework described in the '801 application. Some of these improvements are described in the following set of US patent applications, which are assigned to the present assignee: Ser. No. 13/730,761, Query System and Method to Determine Authentication Capabilities; Ser. No. 13/730,776, System and Method for Efficiently Enrolling, Registering, and Authenticating With Multiple Authentication Devices; Ser. No. 13/730,780, System and Method for Processing Random Challenges Within an Authentication Framework; Ser. No. 13/730,791, System and Method for Implementing Privacy Classes Within an Authentication Framework; Ser. No. 13/730,795, System and Method for Implementing Transaction Signaling Within an Authentication Framework; and Ser. No. 14/218,504, Advanced Authentication Techniques and Applications (hereinafter "'504 application"). These applications are sometimes referred to herein as the ("Co-pending applications").

Briefly, the Co-Pending applications describe authentication techniques in which a user enrolls with authentication devices (or Authenticators) such as biometric devices (e.g., fingerprint sensors) on a client device. When a user enrolls with a biometric device, biometric reference data is captured (e.g., by swiping a finger, snapping a picture, recording a voice, etc). The user may subsequently register/provision the authentication devices with one or more servers over a network (e.g., Websites or other relying parties equipped with secure transaction services as described in the Co-Pending Applications); and subsequently authenticate with those servers using data exchanged during the registration process (e.g., cryptographic keys provisioned into the authentication devices). Once authenticated, the user is permitted to perform one or more online transactions with a Website or other relying party. In the framework described in the Co-Pending Applications, sensitive information such as fingerprint data and other data which can be used to uniquely identify the user, may be retained locally on the user's authentication device to protect a user's privacy.

The '504 application describes a variety of additional techniques including techniques for designing composite authenticators, intelligently generating authentication assurance levels, using non-intrusive user verification, transferring authentication data to new authentication devices, augmenting authentication data with client risk data, and adaptively applying authentication policies, and creating trust circles, to name just a few.

BRIEF DESCRIPTION OF THE DRAWINGS

A better understanding of the present invention can be obtained from the following detailed description in conjunction with the following drawings, in which:

FIG. 3 illustrates a transaction diagram showing remote authentication;

DETAILED DESCRIPTION OF PREFERRED EMBODIMENTS

Figure 1A:
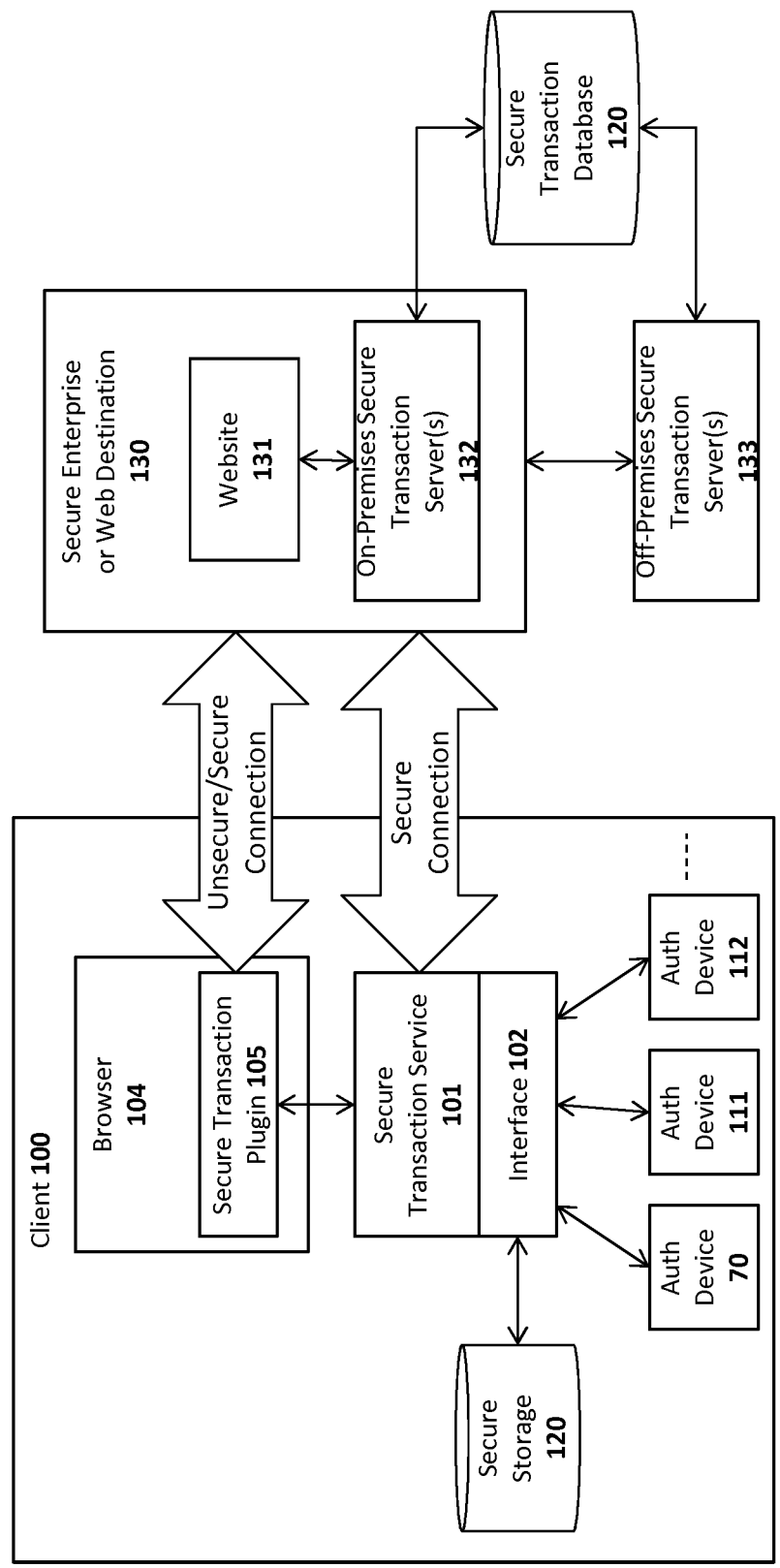
FIGS. 1A-B illustrate two different embodiments of a secure authentication system architecture.

Described below are embodiments of an apparatus, method, and machine-readable medium for implementing advanced authentication techniques and associated applications. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve authentication devices with user verification capabilities such as biometric modalities or PIN entry. These devices are sometimes referred to herein as "tokens," "authentication devices," or "authenticators." While certain embodiments focus on facial recognition hardware/software (e.g., a camera and associated software for recognizing a user's face and tracking a user's eye movement), some embodiments may utilize additional biometric devices including, for example, fingerprint sensors, voice recognition hardware/software (e.g., a microphone and associated software for recognizing a user's voice), and optical recognition capabilities (e.g., an optical scanner and associated software for scanning the retina of a user). The user verification capabilities may also include non-biometric modalities, like PIN entry. The authenticators might use devices like trusted platform modules (TPMs), smartcards and secure elements for cryptographic operations and key storage.

In a mobile biometric implementation, the biometric device may be remote from the relying party. As used herein, the term "remote" means that the biometric sensor is not part of the security boundary of the computer it is communicatively coupled to (e.g., it is not embedded into the same physical enclosure as the relying party computer). By way of example, the biometric device may be coupled to the relying party via a network (e.g., the Internet, a wireless network link, etc) or via a peripheral input such as a USB port. Under these conditions, there may be no way for the relying party to know if the device is one which is authorized by the relying party (e.g., one which provides an acceptable level of authentication strength and integrity protection) and/or whether a hacker has compromised or even replaced the biometric device. Confidence in the biometric device depends on the particular implementation of the device.

The term "local" is used herein to refer to the fact that the user is completing a transaction in person, at a particular location such as at an automatic teller machine (ATM) or a point of sale (POS) retail checkout location. However, as discussed below, the authentication techniques employed to authenticate the user may involve non-location components such as communication over a network with remote servers and/or other data processing devices. Moreover, while specific embodiments are described herein (such as an ATM and retail location) it should be noted that the underlying principles of the invention may be implemented within the context of any system in which a transaction is initiated locally by an end user.

The term "relying party" is sometimes used herein to refer, not merely to the entity with which a user transaction is attempted (e.g., a Website or online service performing user transactions), but also to the secure transaction servers (sometimes referred to as "au" implemented on behalf of that entity which may performed the underlying authentication techniques described herein. The secure transaction servers may be owned and/or under the control of the relying party or may be under the control of a third party offering secure transaction services to the relying party as part of a business arrangement.

The term "server" is used herein to refer to software executed on a hardware platform (or across multiple hardware platforms) that receives requests over a network from a client, responsively performs one or more operations, and transmits a response to the client, typically including the results of the operations. The server responds to client requests to provide, or help to provide, a network "service" to the clients. Significantly, a server is not limited to a single computer (e.g., a single hardware device for executing the server software) and may, in fact, be spread across multiple hardware platforms, potentially at multiple geographical locations.

Exemplary System Architectures and Transactions

Figure 1B:
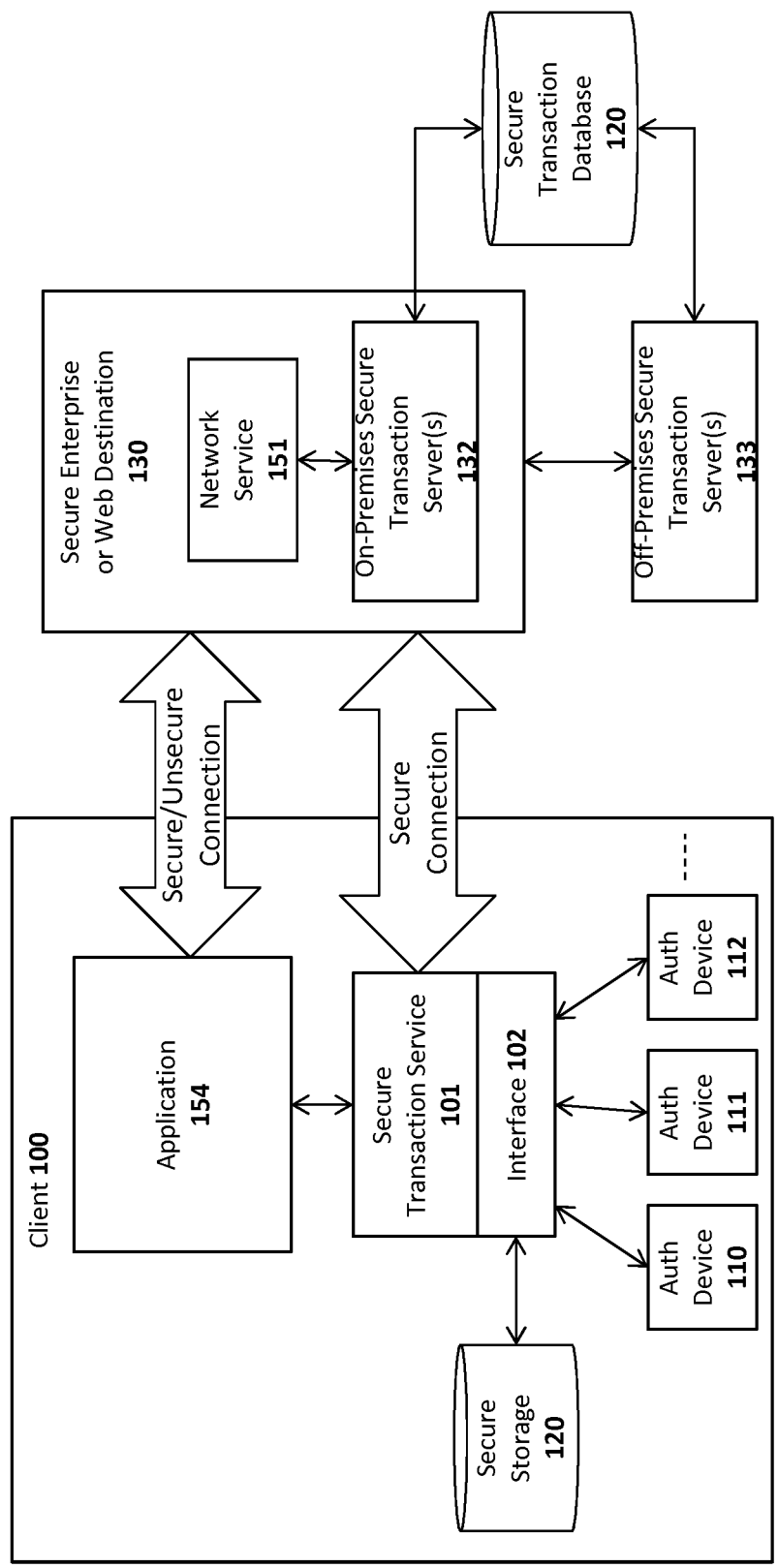

FIGS. 1A-B illustrate two embodiments of a system architecture comprising client-side and server-side components for registering authentication devices (also sometimes referred to as "provisioning") and authenticating a user. The embodiment shown in FIG. 1A uses a web browser plugin-based architecture for communicating with a website while the embodiment shown in FIG. 1B does not require a web browser. The various techniques described herein such as enrolling a user with authentication devices, registering the authentication devices with a secure server, and verifying a user may be implemented on either of these system architectures. Thus, while the architecture shown in FIG. 1A is used to demonstrate the operation of several of the embodiments described below, the same basic principles may be easily implemented on the system shown in FIG. 1B (e.g., by removing the browser plugin 105 as the intermediary for communication between the server 130 and the secure transaction service 101 on the client).

Turning first to FIG. 1A, the illustrated embodiment includes a client 100 equipped with one or more authentication devices 110-112 (sometimes referred to in the art as authentication "tokens" or "Authenticators") for enrolling and verifying an end user. As mentioned above, the authentication devices 110-112 may include biometric device such as fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user) and support for non-biometric modalities, such as PIN verification. The authentication devices might use trusted platform modules (TPMs), smartcards or secure elements for cryptographic operations and key storage.

The authentication devices 110-112 are communicatively coupled to the client through an interface 102 (e.g., an application programming interface or API) exposed by a secure transaction service 101. The secure transaction service 101 is a secure application for communicating with one or more secure transaction servers 132-133 over a network and for interfacing with a secure transaction plugin 105 executed within the context of a web browser 104. As illustrated, the Interface 102 may also provide secure access to a secure storage device 120 on the client 100 which stores information related to each of the authentication devices 110-112 such as a device identification code, user identification code, user enrollment data (e.g., scanned fingerprint or other biometric data) protected by he authentication device, and keys wrapped by the authentication device used to perform the secure authentication techniques described herein. For example, as discussed in detail below, a unique key may be stored into each of the authentication devices and used when communicating to servers 130 over a network such as the Internet.

As discussed below, certain types of network transactions are supported by the secure transaction plugin 105 such as HTTP or HTTPS transactions with websites 131 or other servers. In one embodiment, the secure transaction plugin is initiated in response to specific HTML tags inserted into the HTML code of a web page by the web server 131 within the secure enterprise or Web destination 130 (sometimes simply referred to below as "server 130"). In response to detecting such a tag, the secure transaction plugin 105 may forward transactions to the secure transaction service 101 for processing. In addition, for certain types of transactions (e.g., such as secure key exchange) the secure transaction service 101 may open a direct communication channel with the on-premises transaction server 132 (i.e., co-located with the website) or with an off-premises transaction server 133.

The secure transaction servers 132-133 are coupled to a secure transaction database 120 for storing user data, authentication device data, keys and other secure information needed to support the secure authentication transactions described below. It should be noted, however, that the underlying principles of the invention do not require the separation of logical components within the secure enterprise or web destination 130 shown in FIG. 1A. For example, the website 131 and the secure transaction servers 132-133 may be implemented within a single physical server or separate physical servers. Moreover, the website 131 and transaction servers 132-133 may be implemented within an integrated software module executed on one or more servers for performing the functions described below.

As mentioned above, the underlying principles of the invention are not limited to a browser-based architecture shown in FIG. 1A. FIG. 1B illustrates an alternate implementation in which a stand-alone application 154 utilizes the functionality provided by the secure transaction service 101 to authenticate a user over a network. In one embodiment, the application 154 is designed to establish communication sessions with one or more network services 151 which rely on the secure transaction servers 132-133 for performing the user/client authentication techniques described in detail below.

In either of the embodiments shown in FIGS. 1A-B, the secure transaction servers 132-133 may generate the keys which are then securely transmitted to the secure transaction service 101 and stored into the authentication devices within the secure storage 120. Additionally, the secure transaction servers 132-133 manage the secure transaction database 120 on the server side.

Certain basic principles associated with remotely registering authentication devices and authenticating with a relying party will be described with respect to FIGS. 2-3, followed by a detailed description of embodiments of the invention for performing authentication using machine learning techniques.

Figure 2:
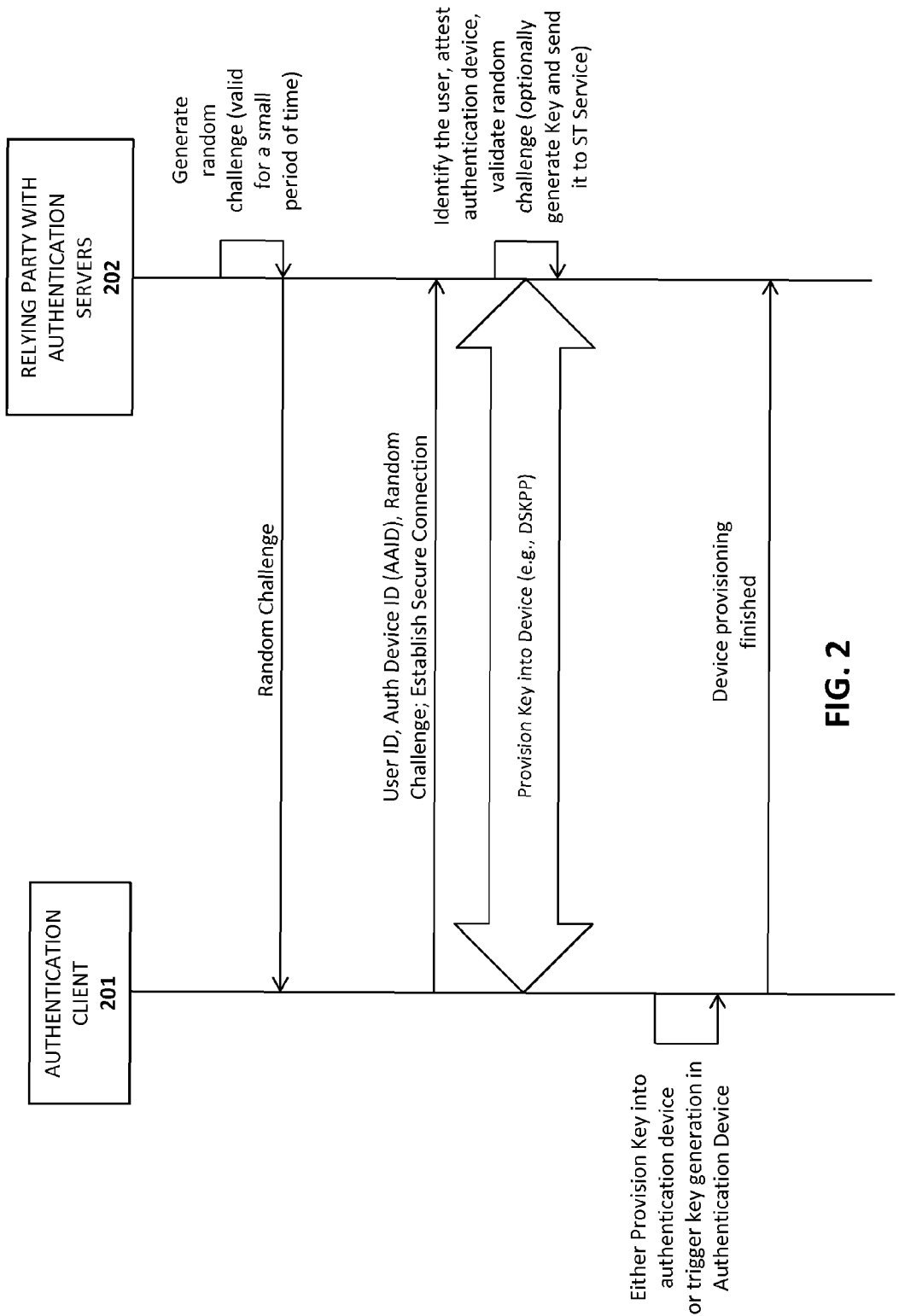
FIG. 2 is a transaction diagram showing how keys may be registered into authentication devices.

FIG. 2 illustrates a series of transactions for registering authentication devices on a client (such as devices 110-112 on client 100 in FIGS. 1A-B) (sometimes referred to as "provisioning" authentication devices). For simplicity, the secure transaction service 101 and interface 102 are combined together as authentication client 201 and the secure enterprise or web destination 130 including the secure transaction servers 132-133 are represented as a relying party 202.

During registration of an authenticator (e.g., a fingerprint authenticator, voice authenticator, etc), a key associated with the authenticator is shared between the authentication client 201 and the relying party 202. Referring back to FIGS. 1A-B, the key may be stored within the secure storage 120 of the client 100 and the secure transaction database 120 used by the secure transaction servers 132-133. In one embodiment, the key is a symmetric key generated by one of the secure transaction servers 132-133. However, in another embodiment discussed below, asymmetric keys are be used. In this embodiment, the public/private key pair may be generated by the secure transaction servers 132-133. The public key may then be stored by the secure transaction servers 132-133 and the related private key may be stored in the secure storage 120 on the client. In an alternate embodiment, the key(s) may be generated on the client 100 (e.g., by the authentication device or the authentication device interface rather than the secure transaction servers 132-133). The underlying principles of the invention are not limited to any particular types of keys or manner of generating the keys.

A secure key provisioning protocol is employed in one embodiment to share the key with the client over a secure communication channel. One example of a key provisioning protocol is the Dynamic Symmetric Key Provisioning Protocol (DSKPP) (see, e.g., Request for Comments (RFC) 6063). However, the underlying principles of the invention are not limited to any particular key provisioning protocol. In one particular embodiment, the client generates a public/private key pair and sends the public key to the server, which may be attested with an attestation key.

Turning to the specific details shown in FIG. 2, to initiate the registration process, the relying party 202 generates a randomly generated challenge (e.g., a cryptographic nonce) that must be presented by the authentication client 201 during device registration. The random challenge may be valid for a limited period of time. In response, the authentication client 201 initiates an out-of-band secure connection with the relying party 202 (e.g., an out-of-band transaction) and communicates with the relying party 202 using the key provisioning protocol (e.g., the DSKPP protocol mentioned above). To initiate the secure connection, the authentication client 201 may provide the random challenge back to the relying party 202 (potentially with a signature generated over the random challenge). In addition, the authentication client 201 may transmit the identity of the user (e.g., a user ID or other code) and the identity of the authentication device(s) to be provisioned registered (e.g., using the authentication attestation ID (AAID) which uniquely identify the type of authentication device(s) being provisioned).

The relying party locates the user with the user name or ID code (e.g., in a user account database), validates the random challenge (e.g., using the signature or simply comparing the random challenge to the one that was sent), validates the authentication device's authentication code if one was sent (e.g., the AAID), and creates a new entry in a secure transaction database (e.g., database 120 in FIGS. 1A-B) for the user and the authentication device(s). In one embodiment, the relying party maintains a database of authentication devices which it accepts for authentication. It may query this database with the AAID (or other authentication device(s) code) to determine if the authentication device(s) being provisioned are acceptable for authentication. If so, then it will proceed with the registration process.

In one embodiment, the relying party 202 generates an authentication key for each authentication device being provisioned. It writes the key to the secure database and sends the key back to the authentication client 201 using the key provisioning protocol. Once complete, the authentication device and the relying party 202 share the same key if a symmetric key was used or different keys if asymmetric keys were used. For example, if asymmetric keys were used, then the relying party 202 may store the public key and provide the private key to the authentication client 201. Upon receipt of the private key from the relying party 202, the authentication client 201 provisions the key into the authentication device (storing it within secure storage associated with the authentication device). It may then use the key during authentication of the user (as described below). In an alternate embodiment, the key(s) are generated by the authentication client 201 and the key provisioning protocol is used to provide the key(s) to the relying party 202. In either case, once provisioning is complete, the authentication client 201 and relying party 202 each have a key and the authentication client 201 notifies the relying party of the completion.

FIG. 3 illustrates a series of transactions for user authentication with the provisioned authentication devices. Once device registration is complete (as described in FIG. 2), the relying party 202 will accept an authentication response (sometimes referred to as a "token") generated by the local authentication device on the client as a valid authentication response.

Turning to the specific details shown in FIG. 3, in response to the user initiating a transaction with the relying party 202 which requires authentication (e.g., initiating payment from the relying party's website, accessing private user account data, etc), the relying party 202 generates an authentication request which includes a random challenge (e.g., a cryptographic nonce). In one embodiment, the random challenge has a time limit associated with it (e.g., it is valid for a specified period of time). The relying party may also identify the authenticator to be used by the authentication client 201 for authentication. As mentioned above, the relying party may provision each authentication device available on the client and stores a public key for each provisioned authenticator. Thus, it may use the public key of an authenticator or may use an authenticator ID (e.g., AAID) to identify the authenticator to be used. Alternatively, it may provide the client with a list of authentication options from which the user may select.

In response to receipt of the authentication request, the user may be presented with a graphical user interface (GUI) requesting authentication (e.g., in the form of a web page or a GUI of an authentication application/app). The user then performs the authentication (e.g., swiping a finger on a fingerprint reader, etc). In response, the authentication client 201 generates an authentication response containing a signature over the random challenge with the private key associated with the authenticator. It may also include other relevant data such as the user ID code in the authentication response.

Upon receipt of the authentication response, the relying party may validate the signature over the random challenge (e.g., using the public key associated with the authenticator) and confirm the identity of the user. Once authentication is complete, the user is permitted to enter into secure transactions with the relying party, as illustrated.

A secure communication protocol such as Transport Layer Security (TLS) or Secure Sockets Layer (SSL) may be used to establish a secure connection between the relying party 201 and the authentication client 202 for any or all of the transactions illustrated in FIGS. 2-3.

System and Method for Performing Authentication Using Data Analytics

The embodiments of the invention include techniques for detecting different behavioral patterns of users and devices by looking at authentication-relevant data on a larger scale and using these patterns to adjust authentication risk for transactions. Traditional authentication systems analyze a single data signal coming from user or a device, such as password or a cryptographic response and make a final authentication decision based on this signal. In contrast, the embodiments of the invention described below perform a larger scale analysis based on various different signals and data associated with user authentication, identifying interesting patterns relevant to a current transaction which cannot be detected with traditional systems.

As mentioned, traditional authentication systems are based on a single source of authentication data such as a user password and authentication keys. Servers commonly store user authentication data in user records and expect to receive proper authentication data during each authentication event. They perform a binary check—i.e., if the verification of authentication data succeeds, then the user is authenticated, if the verification fails, then the user is not authenticated. This scheme successfully works with thousands of websites today.

Even in next generation authentication protocols which allow a user to authenticate to a server using a client device's biometric authenticators, the essential authentication approach is based on binary verifications—i.e., verifications of cryptographic signatures provided by the authenticators. Though the client device may provide multiple cryptographic signatures, the server simply verifies these cryptographic signatures and makes a binary decision of success or failure.

The disadvantage of such systems is that they are vulnerable to advanced attacks. As long as the provided authentication data passes the server side verification, the authentication will be considered successful. However, if the client-side authenticators are compromised and the attacker can generate valid authentication data, these systems may be compromised. Without performing a more advanced analysis by looking at data on a larger scale, it is very difficult to detect such attacks and react appropriately.

Systems in which client-side authenticators are used to authenticate a user to an authentication server (such as described above with respect to FIGS. 1A-B, 2, and 3) have access on interesting data points which can be further analyzed to determine interesting patterns. The more data such systems collect, the richer the analysis will be. The analysis may be performed pre-authentication, during authentication, and/or post-authentication. For example, in one embodiment, the authentication server may look at all previous authentication attempts of a particular user and see if the current authentication operation fits within a larger pattern typical for this user. If it diverges from the typical pattern, then the current operation is less typical and therefore less trusted/riskier. In contrast, if the current authentication operation fits within previous patterns, the system may decide to not overwhelm the user and not require additional authentication or to utilize less intrusive authentication techniques.

Figure 4A:
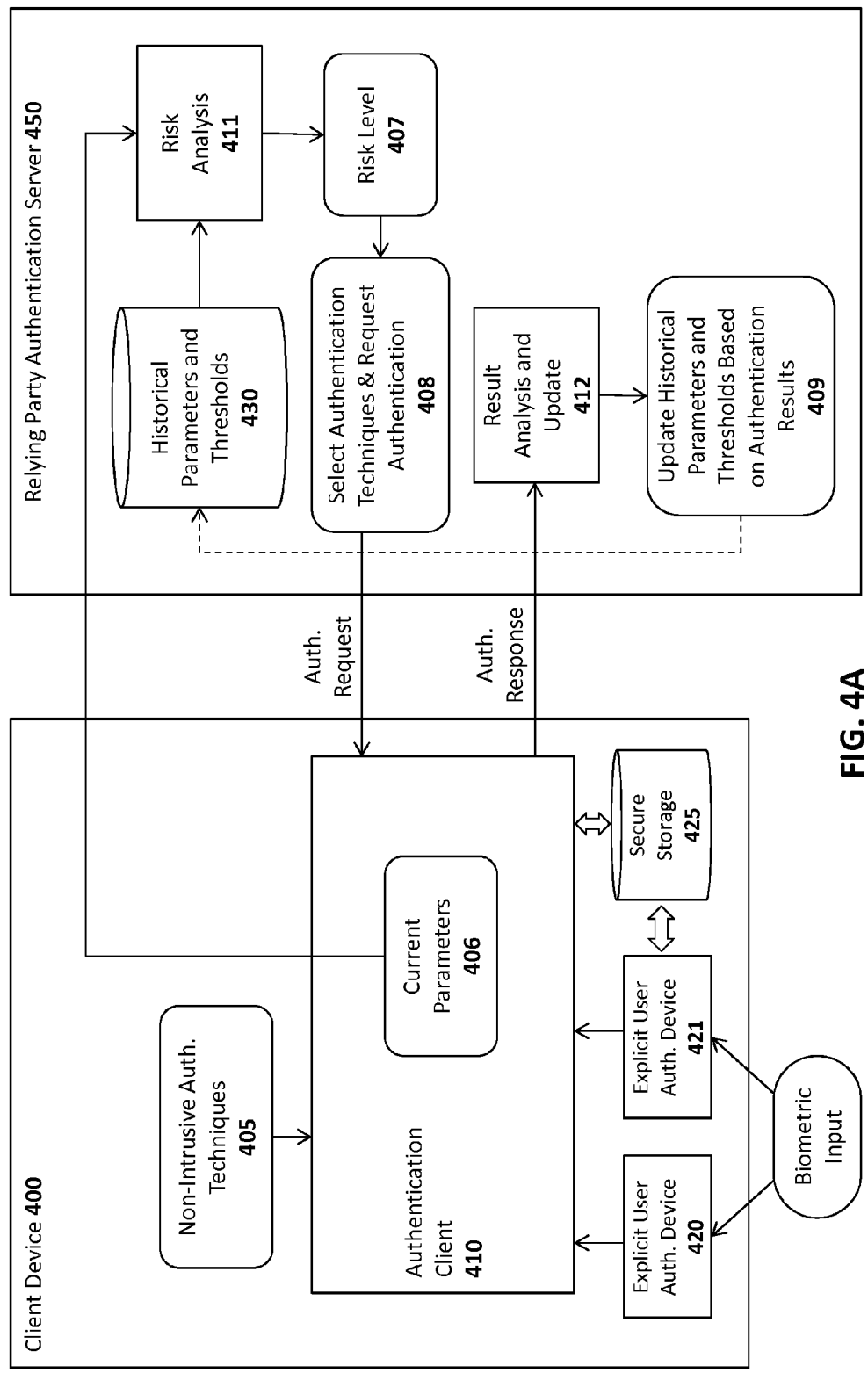
FIGS. 4A-B illustrate different embodiments of a system for performing authentication using machine learning techniques.
Figure 4B:
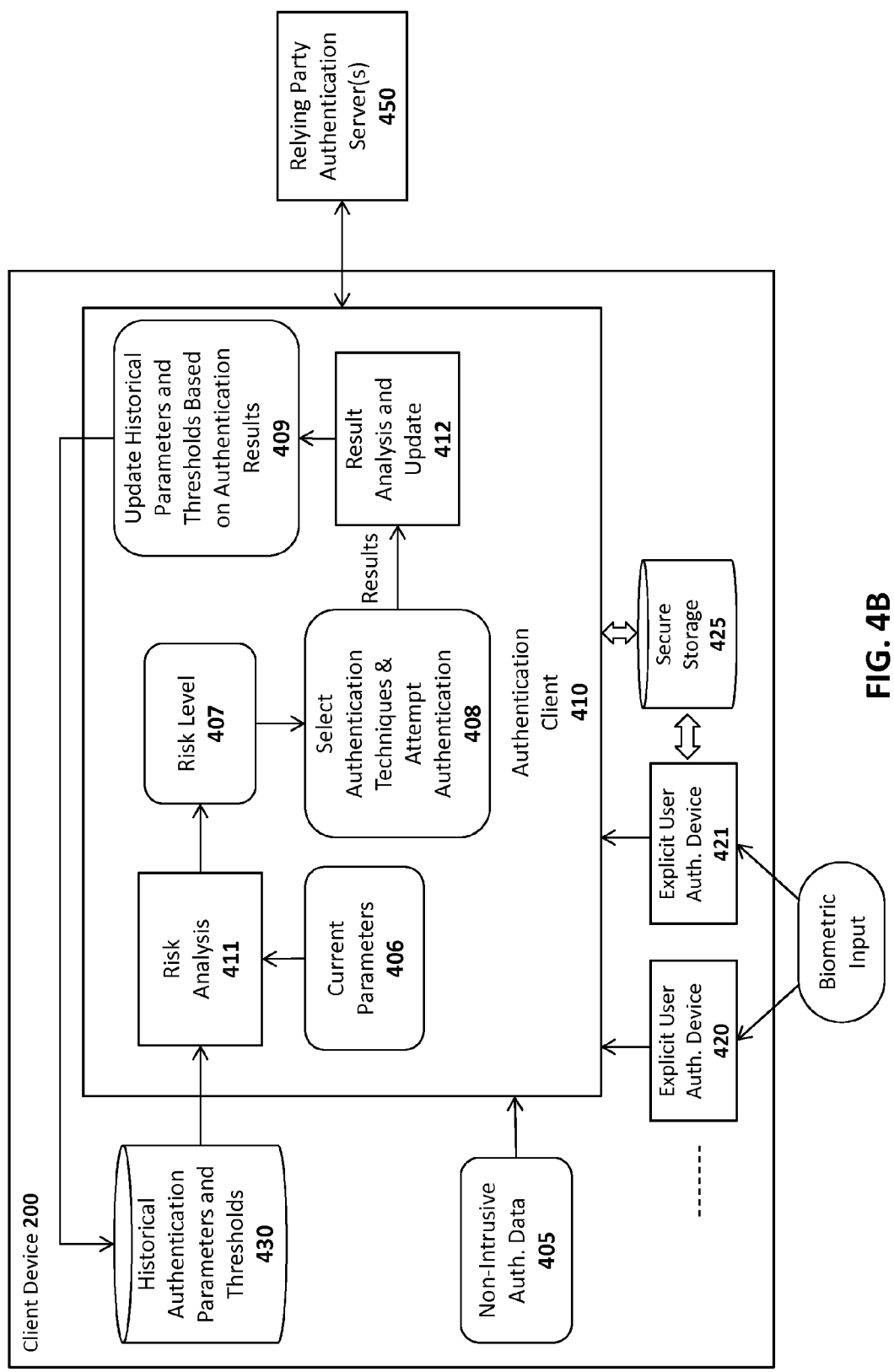

FIG. 4A illustrates one embodiment of the invention in which the logic for performing data analytics to determine the level of risk based on current parameters and selecting authentication techniques is performed on the authentication server 450. FIG. 4B illustrates another embodiment in which the logic is implemented on the client device 400. The underlying principles of the invention remain the same regardless of whether the analysis is performed on the server side or the client side.

Turning first to the embodiment in FIG. 4A, the exemplary client device 400 includes an authentication client 410 for authenticating a user using one or more explicit user authentication devices 420-421 and/or non-intrusive authentication techniques 405. The explicit user authentication devices 420-421 represent any form of authentication which requires explicit user input such as fingerprint authenticators, voice or facial recognition, retinal scanning, or a keyboard (virtual or physical) on which the user may enter a secret password such as a PIN.

The non-intrusive authentication techniques 405 may be used to collect relevant data for determining the likelihood that the legitimate user is in possession of the client device 400. By way of example, and not limitation, the non-intrusive authentication techniques 405 may include determining a user's current location (e.g., via GPS or other location mechanisms) and comparing the current location against locations known to be visited by the end user (e.g., the user's "home" and "work" locations). For example, if the current location of the client device 400 is the user's work, then this may be used by the authentication client 410 when determining whether explicit user authentication is required (e.g., via one of the authentication devices 420-421) and/or the level of explicit user authentication.

In one particular embodiment, the definition of a "location" may not be tied to a set of physical coordinates (as with GPS), but instead be prescribed by the presence of a set of peer devices or other types of network devices. For example, when at work, the client's wireless network adapters (e.g., Wifi adapter, Bluetooth adapter, LTE adapter, etc) may "see" a set of peer network devices (e.g., other computers, mobile phones, tablets, etc) and network infrastructure devices (e.g., Wifi access points, cell towers, etc) on a consistent basis. Thus, the presence of these devices may be used for authentication when the user is at work. Other locations may be defined by the presence of devices in a similar manner such as when the user is at home.

Other non-intrusive authentication techniques 405 may include collecting data from sensors on the client device 400 such as accelerometers. For example, the biometric gait of the user may be measured using an accelerometer or other type of sensor in combination with software and/or hardware designed to generate a gait "fingerprint" of the user's normal walking pattern. Moreover, the current temperature, humidity, pressure and other environmental data may be collected and compared against known environmental data for the alleged current location of the client device 400 (e.g., to confirm that the current environmental readings match with the current asserted location). In addition, the non-intrusive authentication techniques may include measuring the time since the last successful explicit authentication using devices 420-421. The shorter the time, the more likely the current user is the legitimate user of the client device. These and other types of data may be gathered and analyzed to determine a likelihood that the current user is the legitimate user of the client device 400 (and therefore the extent to which explicit user authentication is required).

As mentioned above, a secure storage device 425 may be used to store authentication keys associated with each of the authentication devices 220-221. The authentication keys may be used to sign and encrypt communication with the relying party 250 via a secure communication channel.

In one embodiment, current parameters 406 are collected from the client device 400 by a risk analysis module 411 executed on the relying party authentication server 450. Numerous exemplary parameters are set forth below. The risk analysis module 411 may then compare the current parameters 406 against historical parameters and thresholds 430 maintained in storage on the authentication server 450 to determine a risk level 407 for the current transaction. In one embodiment, the risk level 407 represents the extent to which the current parameters 406 deviate from the historical parameters 430 (e.g., the "distance" between the current parameters and historical parameters) collected during prior successful authentications and/or the extent to which the current parameters 406 correlate with the historical parameters 430 collected during prior unsuccessful authentication attempts or fraudulent authentication attempts (which will tend to indicate greater risk). As discussed in detail below, in one embodiment, the risk level 407 is determined using an anomaly detection algorithm which uses a distance function to specify the distance between the current parameters 406 and the historical parameters 430 (as discussed in detail below).

In one embodiment, based on the detected risk level 407, the authentication server 450 selects authentication techniques 408 required to authenticate the user. In general, the greater the risk level 407 (e.g., the greater the distance from parameters indicating "normal" behavior), the more rigorous the authentication. For example, in one embodiment, if the risk level is above a specified threshold, then the authentication server 450 may require authentication using one or more explicit user authentication devices 420-421. In contrast, for a risk level below a specified threshold, then non-intrusive authentication techniques 405 may be sufficient. As mentioned above, the authentication request sent from the relying party may include other forms of security-related data such as a cryptographic nonce.

In response to the authentication request sent from the relying party, the authentication client 410 prompts the user to perform authentication using one or more specified authentication devices 420-421 (if explicit authentication is required). If the user successfully authenticates (e.g., swipes a registered finger on a fingerprint authenticator), then the authentication client 410 sends back an authentication response indicating a successful authentication. The authentication client 410 may send other security-related data with the authentication response such as the cryptographic nonce and/or a signature generated using the encryption key of the authenticator. The authentication server 450 may then verify the authentication response (e.g., verifying the cryptographic nonce and using a corresponding authenticator key to verify the signature). If verification is successful, the user will be allowed to perform the desired transaction. For example, in one embodiment, the authentication server 450 may send an indication of a successful authentication to the relying party Web server to permit the user to complete a transaction.

In one embodiment, a result analysis and update module 412 analyzes the parameters associated with the successful authentication or unsuccessful authentication attempt to generate updates 409 to the historical parameters and thresholds. For example, if the authentication is successful, then the current parameters 406 may be added as historical parameters 430 associated with successful authentications (thereby decreasing the "riskiness" associated with these parameters). In contrast, if the authentication is unsuccessful and/or if fraud is detected, then the update generated by the result analysis and update module 412 may associate one or more of the current parameters 406 will unsuccessful authentication attempts (e.g., making the existence of those parameters in future authentication attempts indicate a higher risk). For example, if the current parameters 406 indicate that the user is in a previously unobserved location and the authentication is unsuccessful, then the result analysis and update module 412 may update thresholds and/or weights associated with this location to increase the risk associated with this location. The resulting data is then integrated with the historical authentication parameters and thresholds database 430. Various different types of algorithms including machine learning algorithms (as described below) may be used by the result analysis and update module 412 to provide updates to the historical data.

In this manner, the result analysis and update module 412 continually analyzes and generates correlations for new authentication events (successful and unsuccessful) and responsively updates the existing historical data 430. The risk analysis module 411 may then use the updated historical data 430 for subsequent authentication attempts. Although illustrated as separate modules in FIGS. 4A-B, the risk analysis module 411 and result analysis and update module 412 may be implemented as a single integrated machine learning module to continually evaluate parameters related to user activity and update the historical database 430.

In one embodiment, the historical parameters and thresholds 430 are set based solely on the "normal" patterns of the user. That is, rather than incorporating data related to unsuccessful authentication events or fraudulent activities, the historical parameters 430 may be updated to include data related only to successful authentication events. Thus, in this embodiment, the risk analysis module 411 will attempt to measure the deviation from this normal user profile and generate a risk level 407 based on the amount of deviation from normal user behavior (e.g., based on whether one or more thresholds have been crossed as discussed below).

FIG. 4B illustrates an embodiment in which the risk analysis module 411 and result analysis and update module 412 are implemented within the authentication client 410 rather than on the authentication server 450 (or in addition to the implementation on the authentication server). As in the server-side embodiment shown in FIG. 4A, in this embodiment the risk analysis module 411 evaluates correlations between current parameters 406 and historical parameters 430 to determine the risk level 407 associated with the current transaction. Based on the risk level 407, the authentication client selects one or more authentication techniques 408 and provides the authentication results to the result analysis and update module 412 which then updates the historical parameters and threshold based on the current parameters 406 and the authentication results. Various specific parameters and authentication results which may be evaluated are provided below.

In one embodiment, the parameters collected and evaluated to determine the risk level 407 may include the identity of each user and a variety of data related to the authenticators 420-421 registered at the authentication server including, for example, the authentication attestation IDs (AAIDs) which uniquely identify the types of authentication device(s) registered; the Key IDs associated with the keys exchanged during authenticator registration (and stored in secure storage 425 on the client and the authentication server); cryptographic key data used for validating cryptographic signatures generated with the keys; a signature counter indicating the number of times signatures have been generated with the keys; and the authenticator version indicating the version of each of the authenticators. In addition, the parameters used to determine the risk level may include metadata associated with each of the authenticators such as the AAID (mentioned above), the authenticator vendor, the authenticator type (e.g., indicating if the authenticator is internal or external to the client), the authentication factor (e.g., fingerprint, voiceprint, presence, etc), and the key protection method (e.g., Trusted Execution Environment, Secure Elements, etc).

In order to perform a more detailed analysis, one embodiment of the invention collects and analyzes one or more of the following different parameters:

1. Parameters related to cryptographic key usage data
Timestamp of the operation
KeyID of the used key
Authentication operation performed
Indication of success or failure of the signature verification
Transaction ID associated with the operation
Transaction risk score associated with this operation
Final transaction authentication status (success or failure)
2. Parameters related to state transitions of the keys
Timestamp of transition
KeyID of the transitioning key
Authenticator version of the transitioning authenticator
Transitioned state (e.g., Good, Under Attack, Deregistered, Duplicated, Compromised)
3. Parameters related to post-authentication fraud reports
Timestamp of the fraud
Transaction ID of transaction that has been reported as fraudulent 4. Parameters related to historical security strength of keys
Timestamp of sampling
KeyID of the cryptographic key
Security strength by the time of sampling
5. Parameters related to historical security strength of authenticators
Timestamp of sampling
AAID of the authenticator
Security strength by the time of sampling
6. Additional parameters collected from alternative data sources
User device GPS location
User device surrounding WiFi information
Digital fingerprint of the user device
biometric score collected from user's biometric device
7. User activity parameters
Timestamp of user registration
Timestamp of last successful login
Last local authentication method and its timestamp In one embodiment, the risk analysis module 411 determines the current risk level 407 by evaluating the parameters in the manner specified below. The evaluations may be based on (1) parameters related to the AAIDs and Keys on a client device; (2) parameters related to the time of user authentication; (3) parameters related to the location of the client device; (4) parameters related to network connectivity of the client device; and (5) parameters related to the biometric score generated by the authentication client (e.g., in response to a user authentication attempt).

1. AAIDs and Keys

In one embodiment, the number of times a cryptographic key or AAID has been successfully used in the past will decrease the risk associated with the use of that cryptographic key or AAID. In contrast, the number of times the cryptographic key or AAID has been associated with an unsuccessful authentication attempt or an attempted fraud will increase the risk associated with that cryptographic key or AAID. In one embodiment, the number of successful authentication attempts may be compared to authentication attempts using other cryptographic keys or AAIDs. If this key/AAID is used significantly less frequently than other keys/AAIDs then this may increase the risk level associated with its use.

Other variables which may be evaluated include the last time the cryptographic key has been used and the last time this user has used any authenticator. For example, if the user has not used the authenticator (or any authenticator) for an extended period of time (e.g., over a threshold), then this may increase the risk associated with the authenticator. In addition, if the cryptographic key has ever been duplicated and/or the frequency with which this AAID's keys are being duplicated may be considered to determine the risk (e.g., with more duplication indicating more risk).

Additional variables which may be evaluated include the frequency with which this cryptographic key's state been changed to "under_attack" (thereby indicating greater risk), the number of times this user deleted authenticators from his/her account, the number of times the user registered/deregistered a particular AAID (, the frequency with which users deregistered this AAID, the length of time the user used this AAID before he/she chose to deregister it; the number of times any authenticator from this vendor has been compromised; the number of times that this authenticator version has been compromised; the number of times this user has attempted to register authenticators within different specified periods of time (e.g., the last 20 seconds, 5 minutes, 60 minutes, 1 day, 7 days); and the number of times this user attempted to authenticate using an authenticator within last specified time period (e.g., 20 seconds, 5 minutes, 60 minutes, 1 day, 7 days).

2. Time of Authentication

In one embodiment, the periods of time during the day that the user typically requests authentication, the number of times per day/week/month that the user typically requests authentication may be evaluated to determine risk. For example, if the current authentication request is not at a typical time and/or day and/or if the number of times authentication has been requested per day/week/month is out of the norm, then this may indicate fraudulent activity. Another variable which may be evaluated is an indication as to whether this is an appropriate time for authentication for with this particular authenticator 3. Location In one embodiment, the location variables evaluated to determine risk include the number of times this authenticator has been seen near the current location, the last time has this authenticator been seen near the given location, the amount of fraud seen in the past near this location, the amount of fraud seen in this location using this AAID, the distance of this location from the usual locations for this user, the distance this location is from the location where the user authenticated last time, and the general risk associated with this location/country.

4. Network Connectivity

In one embodiment, the network variables evaluated to determine risk include the number of times this user/key been seen near the given WiFi (or other network) range; the number of times a device within given the WiFi (or other network) range been involved in fraudulent activities; and the likelihood that the given WiFi is really available in the current alleged location.

5. Biometric Score

In one embodiment, the biometric score generated by the client's authenticator 420-421 may be used to determine risk. For example, the statistical average of the biometric score may be determined for this AAID. If the current score is a specified distance from the average, then this may indicate greater risk. In addition, the average biometric score for this particular user may be compared against the current score. Once again, if the current score is a specified distance from the average, then this may indicate greater risk.

Figure 5:
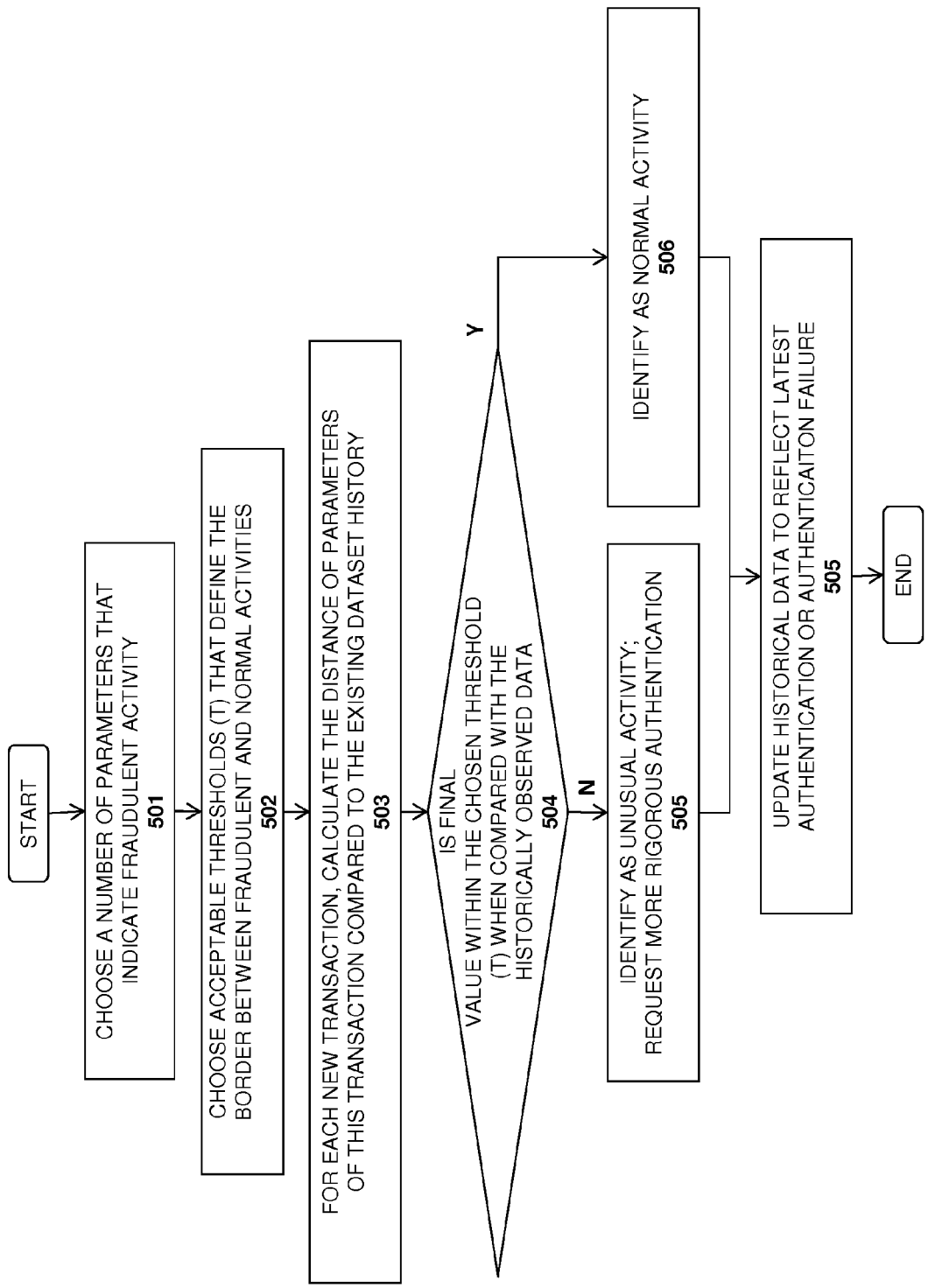
FIG. 5 illustrates one embodiment of a method for performing authentication using machine learning techniques.

In one embodiment of the invention, machine learning techniques are employed to identify the specific parameters which indicate fraudulent activity and/or legitimate activity (such as those described above). FIG. 5 illustrates one embodiment of a method for determining and evaluating parameters to evaluate risk. The method may be implemented within the context of the system architectures shown in FIGS. 4A-B but is not limited to any particular system architecture.

At 501, a number of parameters are selected which may be correlated to fraudulent activity. In one embodiment, the initial set of parameters are selected using a training process in which the parameters and authentication results are provided as input to a machine learning algorithm which identifies correlations between the parameters and fraudulent and/or legitimate activity. The end result is that certain parameters are identified which are highly correlated to legitimate and/or fraudulent activities.

At 502, one or more thresholds (T) are selected based on an evaluation of the parameters. In one embodiment, the selected thresholds define the borders between "fraudulent," "suspicious" and/or "normal" activities. For example, thresholds may be set for ranges of times during which authentication attempts are considered "normal." Times outside of these ranges may be considered suspicious or fraudulent and may increase the risk level accordingly. Various other thresholds may be determined using any or all of the parameters discussed above. In one embodiment, the thresholds may be set automatically by the machine learning algorithm which, as mentioned, identifies a correlation between fraudulent/legitimate activity and the various parameters.

Once the initial parameters and thresholds are determined, at 503 the distance of the parameters for the current transaction are compared to the existing historical parameters. This is accomplished in one embodiment with a mathematical approach using machine learning or other algorithm capable of determining correlations between data sets. In general, the greater the distance to "normal" parameters, the more risk associated with the current transaction.

Following the evaluation, at 504, a determination is made as to whether the final value for the parameters are within the chosen threshold(s) when compared to the historical data set. If not, then at 505 this is determined to be an unusual activity (e.g., suspicious or fraudulent) and user may be required to authenticate using more rigorous authentication techniques (e.g., explicit biometric authentication). In the embodiment shown in FIG. 4, the risk level 407 may be elevated, thereby requiring more stringent authentication. If the parameters are within the selected thresholds, then at 506 the interaction is considered to be a normal activity and less rigorous (or no) authentication may be used (e.g., non-intrusive authentication such as described above).

In either case, at 506, the historical data is updated to reflect the latest authentication results. In this manner, the historical data used to detect suspicious or fraudulent activity may be continually updated to reflect new data points and thresholds. For example, if the user enters into a transaction from an uncharacteristic location or at an unusual time, then this may be identified as an unusual activity at 505. However, if the user successfully authenticates, then at 506 the historical data may be updated to reflect the fact that the legitimate user authenticated at this particular location and time. Consequently, this particular location and/or time may no longer be considered "unusual" or, more precisely, the "riskiness" associated with this location and/or time may be decreased.

Different mathematical approaches may be used to determine the "distance" between the parameters of the current transaction and the historical parameters (e.g., operation 503 in FIG. 5). One particular approach is known as Anomaly Detection which may be based on a Gaussian distribution. While the discussion below will focus on Anomaly Detection, various other machine learning algorithms can also be applied.

Figure 6:
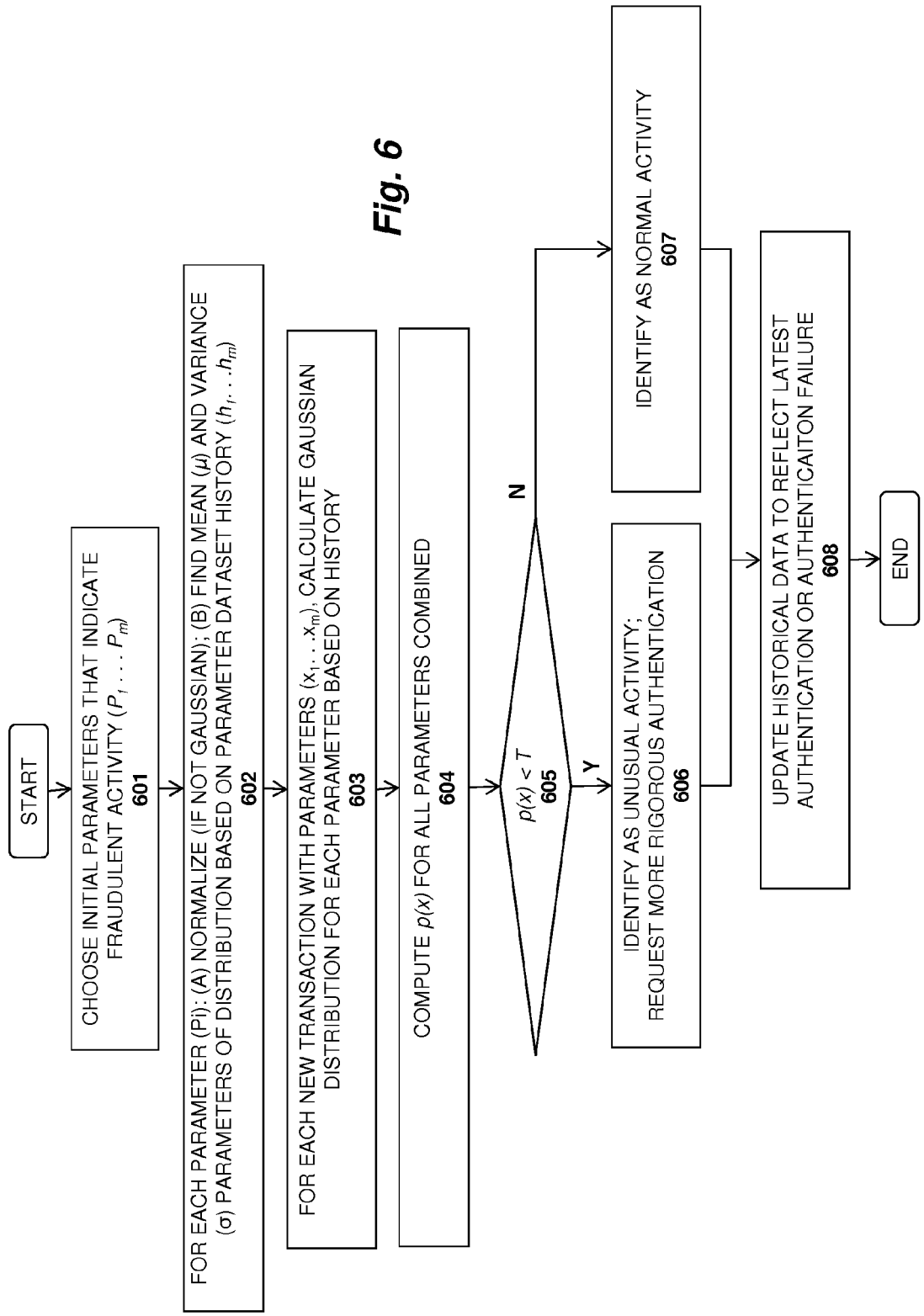
FIG. 6 illustrates another embodiment of a method for performing authentication using machine learning techniques.

An Anomaly Detection algorithm employed in one embodiment of the invention is illustrated in FIG. 6. At 601, a set of initial parameters are selected that may be used to indicate fraudulent activity ($P_1 \ldots P_m$). Ideally, the parameters are selected to have the strongest correlation with fraudulent and/or legitimate activities. As mentioned above, the initial parameters may be selected using a training process using existing authentication data collected over a period of time.

At 602, for each parameter ($P_i$), with an existing dataset history ($h_1 \ldots h_m$), the dataset is normalized if it is not sufficiently Gaussan. Once normalized, the mean ($\mu$) and the variance ($\sigma$) parameters of the Gaussian distribution are determined based on the dataset history ($h_1 \ldots h_m$). In one embodiment, this is accomplished using the following equations:

$$\mu_i = \frac{1}{m} \times \sum_{j=1}^{m} h_j. \quad \text{i}$$

$$\sigma_i^2 = \frac{1}{m} \times \sum_{j=1}^{m} (h_j - \mu_i)^2. \quad \text{ii}$$

At 603, for each new transaction with parameters ($x_1 \ldots x_m$), the Gaussian distribution for each new parameter is calculated based on the history. In one embodiment, this is accomplished with the following equation:

$$p(x_i) = \frac{1}{\sigma_i \sqrt{2\pi}} \times e^{\frac{-(x_i - \mu_i)^2}{2 \times \sigma_i^2}}. \quad \text{i}$$

At 604, p(x) is computed for all parameters combined. In one embodiment, this is accomplished according to the following equation:

$$p(x) = \prod_{j=1}^{m} p(x_j). \quad \text{i}$$

If p(x)<T (the chosen threshold), determined at 605, then this is determined to be an unusual behavior at 606. Consequently, one or more rigorous authentication techniques may be requested (e.g., explicit biometric authentication). If, however, p(x)≥T, then at 607, the interaction is identified as a normal activity and less stringent authentication (e.g., non-intrusive authentication as described above) or no authentication may be required.

In either case, at 608, the dataset history is updated with the new parameters ($P_1 \ldots P_m$) and the associated authentication results. For example, if authentication was successful at 606, then the dataset history may be updated to reflect the successful authentication associated with these parameters.

Exemplary Data Processing Devices

Figure 7:
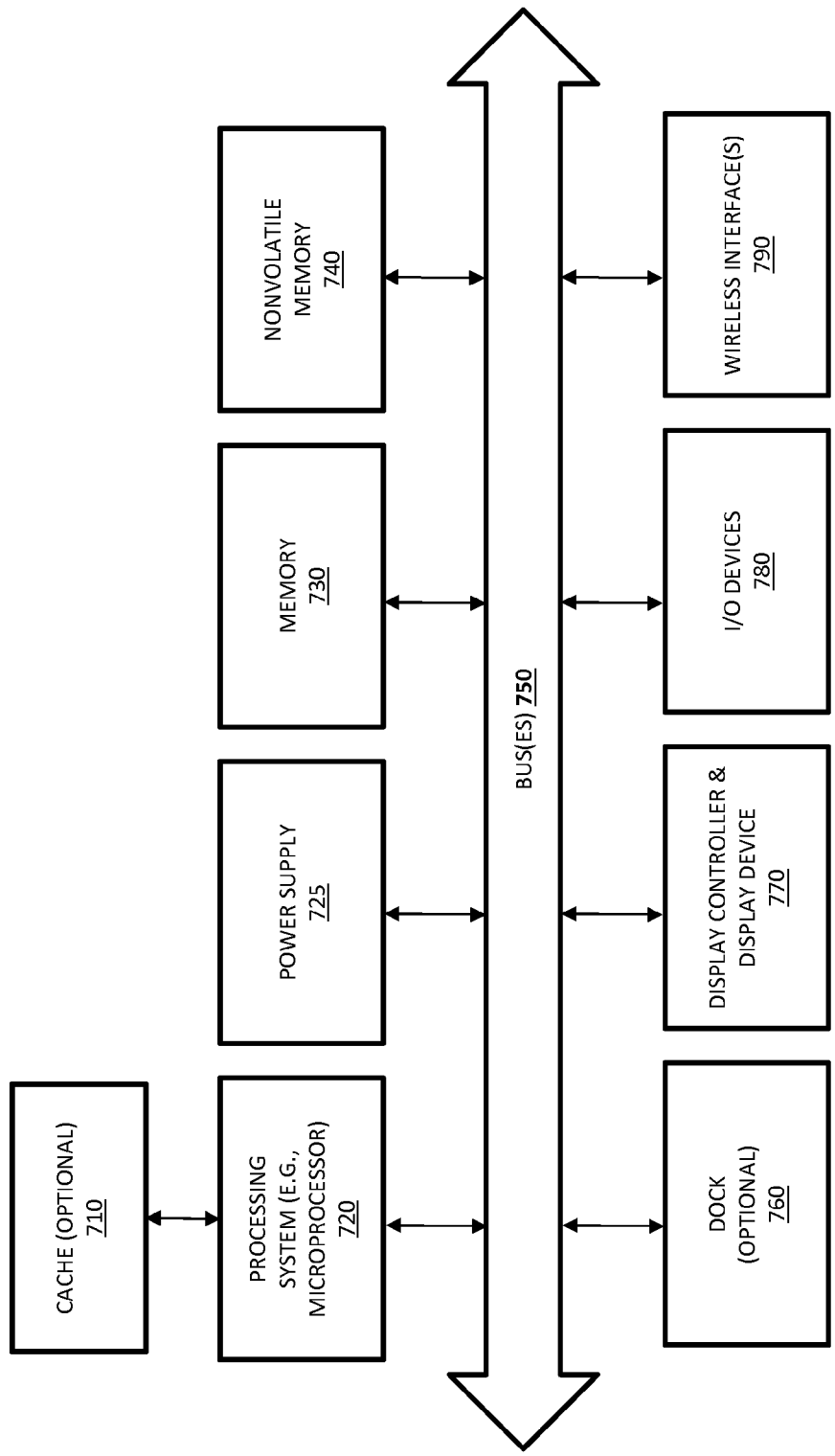
FIG. 7 illustrates one embodiment of a computer architecture used for servers and/or clients.

FIG. 7 is a block diagram illustrating an exemplary clients and servers which may be used in some embodiments of the invention. It should be understood that while FIG. 7 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 7, the computer system 700, which is a form of a data processing system, includes the bus(es) 750 which is coupled with the processing system 720, power supply 725, memory 730, and the nonvolatile memory 740 (e.g., a hard drive, flash memory, Phase-Change Memory (PCM), etc.). The bus(es) 750 may be connected to each other through various bridges, controllers, and/or adapters as is well known in the art. The processing system 720 may retrieve instruction(s) from the memory 730 and/or the nonvolatile memory 740, and execute the instructions to perform operations as described above. The bus 750 interconnects the above components together and also interconnects those components to the optional dock 760, the display controller & display device 770, Input/Output devices 780 (e.g., NIC (Network Interface Card), a cursor control (e.g., mouse, touchscreen, touchpad, etc.), a keyboard, etc.), and the optional wireless transceiver(s) 790 (e.g., Bluetooth, WiFi, Infrared, etc.).

Figure 8:
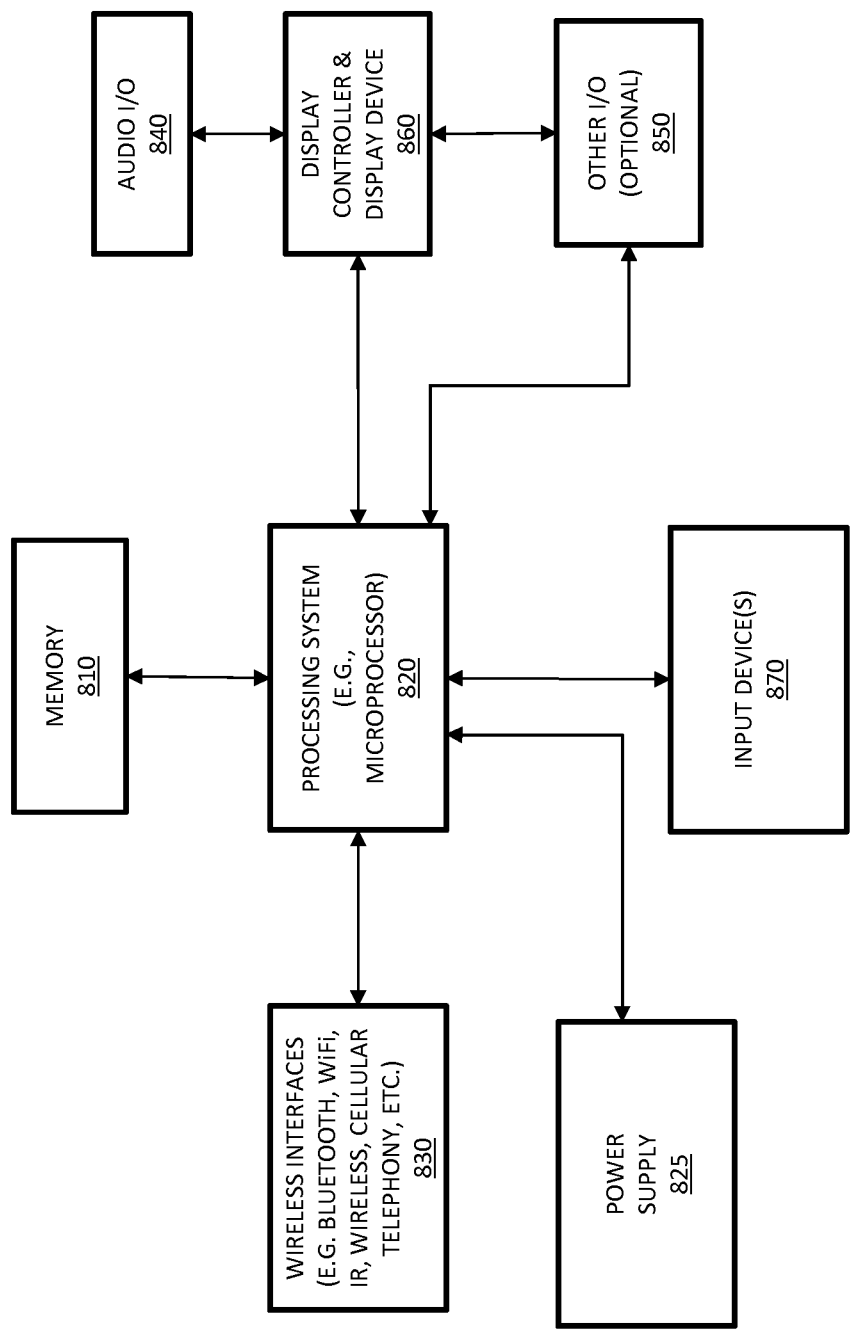
FIG. 8 illustrates one embodiment of a computer architecture used for servers and/or clients.

FIG. 8 is a block diagram illustrating an exemplary data processing system which may be used in some embodiments of the invention. For example, the data processing system 800 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 800 may be a network computer or an embedded processing device within another device.

According to one embodiment of the invention, the exemplary architecture of the data processing system 800 may be used for the mobile devices described above. The data processing system 800 includes the processing system 820, which may include one or more microprocessors and/or a system on an integrated circuit. The processing system 820 is coupled with a memory 810, a power supply 825 (which includes one or more batteries) an audio input/output 840, a display controller and display device 860, optional input/output 850, input device(s) 870, and wireless transceiver(s) 830. It will be appreciated that additional components, not shown in FIG. 8, may also be a part of the data processing system 800 in certain embodiments of the invention, and in certain embodiments of the invention fewer components than shown in FIG. 8 may be used. In addition, it will be appreciated that one or more buses, not shown in FIG. 8, may be used to interconnect the various components as is well known in the art.

The memory 810 may store data and/or programs for execution by the data processing system 800. The audio input/output 840 may include a microphone and/or a speaker to, for example, play music and/or provide telephony functionality through the speaker and microphone. The display controller and display device 860 may include a graphical user interface (GUI). The wireless (e.g., RF) transceivers 830 (e.g., a WiFi transceiver, an infrared transceiver, a Bluetooth transceiver, a wireless cellular telephony transceiver, etc.) may be used to communicate with other data processing systems. The one or more input devices 870 allow a user to provide input to the system. These input devices may be a keypad, keyboard, touch panel, multi touch panel, etc. The optional other input/output 850 may be a connector for a dock.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

I claim:

1. A method implemented within an authentication system comprising:
   selecting a set of parameters related to user activity on a client device;
   receiving a request to authenticate the user for a current transaction;
   responsively calculating a distance between parameters associated with the current transaction and historical parameters from an existing dataset;
   determining a risk level associated with the current transaction based on the calculated distances between the parameters associated with the current transaction and the historical parameters;
   selecting one or more authentication techniques required to authenticate the user based on the risk level;
   performing the one or more authentication techniques to attempt to authenticate the user and generating an authentication result;
   updating the historical parameters using the parameters associated with the current transaction and the authentication result; and
   employing machine learning to select the set of parameters by performing a correlation between each parameter and results of prior authentication events.

2. The method as in claim 1 wherein the parameters include parameters associated with authenticator identifiers or keys used to perform authentication, parameters associated with a time of authentication, parameters associated with a location of authentication, parameters associated with network connectivity and/or parameters associated with a biometric score generated by a client device authenticator.

3. The method as in claim 1 wherein the risk level is set to a first level representing a normal user behavior if the distance between one or more of the parameters associated with the current transaction and the corresponding historical parameters is below a specified threshold.

4. The method as in claim 3 wherein the risk level is set to a second level representing a suspicious user behavior if the distance between one or more of the parameters associated with the current transaction and the corresponding historical parameters is above a specified threshold.

5. The method as in claim 1 wherein selecting comprises:
   selecting more rigorous authentication techniques for relatively higher risk levels and selecting relatively less rigorous authentication techniques or no authentication techniques for relatively lower risk levels.

6. The method as in claim 5 wherein the more rigorous authentication techniques comprise explicit biometric user authentication.

7. The method as in claim 6 wherein the less rigorous authentication techniques comprise non-intrusive authentication techniques.

8. The method as in claim 1 wherein parameters are selected to be included in the set of parameters which have a relatively high correlation with successful authentication events and/or unsuccessful authentication events.

9. The method as in claim 1 wherein calculating a distance between parameters associated with the current transaction and historical parameters comprises performing anomaly detection using a Gaussian distribution of the parameters.

10. A non-transitory machine-readable medium having program code stored thereon which, when executed by a machine, causes the machine to perform the operations of:
    selecting a set of parameters related to user activity on a client device;
    receiving a request to authenticate the user for a current transaction;
    responsively calculating a distance between parameters associated with the current transaction and historical parameters from an existing dataset;
    determining a risk level associated with the current transaction based on the calculated distances between the parameters associated with the current transaction and the historical parameters;
    selecting one or more authentication techniques required to authenticate the user based on the risk level;
    performing the one or more authentication techniques to attempt to authenticate the user and generating an authentication result;
    updating the historical parameters using the parameters associated with the current transaction and the authentication result; and
    employing machine learning to select the set of parameters by performing a correlation between each parameter and results of prior authentication events.

11. The machine-readable medium as in claim 10 wherein the parameters include parameters associated with authenticator identifiers or keys used to perform authentication, parameters associated with a time of authentication, parameters associated with a location of authentication, parameters associated with network connectivity and/or parameters associated with a biometric score generated by a client device authenticator.

12. The machine-readable medium as in claim 10 wherein the risk level is set to a first level representing a normal user behavior if the distance between one or more of the parameters associated with the current transaction and the corresponding historical parameters is below a specified threshold.

13. The machine-readable medium as in claim 12 wherein the risk level is set to a second level representing a suspicious user behavior if the distance between one or more of the parameters associated with the current transaction and the corresponding historical parameters is above a specified threshold.

14. The machine-readable medium as in claim 10 wherein selecting comprises:
selecting more rigorous authentication techniques for relatively higher risk levels and selecting relatively less rigorous authentication techniques or no authentication techniques for relatively lower risk levels.

15. The machine-readable medium as in claim 14 wherein the more rigorous authentication techniques comprise explicit biometric user authentication.

16. The machine-readable medium as in claim 15 wherein the less rigorous authentication techniques comprise non-intrusive authentication techniques.

17. The machine-readable medium as in claim 10 wherein parameters are selected to be included in the set of parameters which have a relatively high correlation with successful authentication events and/or unsuccessful authentication events.

18. The machine-readable medium as in claim 10 wherein calculating a distance between parameters associated with the current transaction and historical parameters comprises performing anomaly detection using a Gaussian distribution of the parameters.

19. A system comprising:
a client device providing a set of parameters related to activity of a current user;
an authentication server to receive a request to authenticate the user for a current transaction;
the authentication server comprising a risk analysis circuitry to responsively calculate a distance between parameters associated with the current transaction and historical parameters from an existing dataset;
the risk analysis circuitry to determine a risk level associated with the current transaction based on the calculated distances between the parameters associated with the current transaction and the historical parameters and selecting one or more authentication techniques required to authenticate the user based on the risk level;
the client device comprising an authentication engine to perform the one or more authentication techniques to attempt to authenticate the user and generating an authentication result;
a result analysis and update circuitry to update the historical parameters using the parameters associated with the current transaction and the authentication result; and
employing machine learning to select the set of parameters by performing a correlation between each parameter and results of prior authentication events.

20. The system as in claim 19 wherein the parameters include parameters associated with authenticator identifiers or keys used to perform authentication, parameters associated with a time of authentication, parameters associated with a location of authentication, parameters associated with network connectivity and/or parameters associated with a biometric score generated by a client device authenticator.

21. The system as in claim 19 wherein the risk level is set to a first level representing a normal user behavior if the distance between one or more of the parameters associated with the current transaction and the corresponding historical parameters is below a specified threshold.

22. The system as in claim 21 wherein the risk level is set to a second level representing a suspicious user behavior if the distance between one or more of the parameters associated with the current transaction and the corresponding historical parameters is above a specified threshold.

* * * * *